United States Patent [19]

Duncan et al.

[11] Patent Number: 5,400,577
[45] Date of Patent: Mar. 28, 1995

[54] TOBACCO HARVESTER

[75] Inventors: George A. Duncan, 112 Vanderbilt Dr., Lexington, Ky. 40517; Billy L. Tapp, Paris, Ky.

[73] Assignee: George A. Duncan, Lexington, Ky.

[21] Appl. No.: 106,085

[22] Filed: Aug. 13, 1993

[51] Int. Cl.6 ............................................. A01D 45/16
[52] U.S. Cl. ......................................... 56/27.5; 414/26
[58] Field of Search ............................. 56/27.5; 414/26

[56] References Cited

U.S. PATENT DOCUMENTS

| | | | |
|---|---|---|---|
| 3,798,884 | 3/1974 | Middleton | 56/27.5 |
| 3,855,762 | 12/1974 | Middleton | 56/27.5 |
| 3,902,607 | 9/1975 | Middleton | 56/27.5 X |
| 4,510,740 | 4/1985 | Foster | 56/27.5 |

Primary Examiner—David J. Bagnell
Attorney, Agent, or Firm—Frank C. Leach, Jr.

[57] ABSTRACT

A tobacco harvester includes a plurality of linearly spaced tobacco plant engaging flights attached to an endless chain at equal linear distances with the sensing of a tobacco plant at a first position resulting in a cycle of operation occurring to advance the plant from its first position to a second position just beyond the front end of a spear. The plant is centered by an upper driven belt and a lower non-driven belt between which the plant is advanced by one of the flights. A paddle wheel is rotated 180° during each advancement of a tobacco plant from its first position to its second position and aids in advancing the plant between the two centering belts. When another plant is sensed at the first position, the first tobacco plant is advanced from its second position to a third position on a stick at the rear of the spear. As the plant is advanced along the spear, each of at least three pairs of pivotally mounted support arms is moved out of the way of the plant through another of the tobacco plant engaging flights acting on a separate switch for each pair. Each tobacco plant is advanced a selected distance along the stick during each cycle of operation until a selected number of the plants is on the stick. The stick with the plants is removed from its tobacco plant receiving position at the end of the stick when another stick is positioned for loading, either manually or automatically.

20 Claims, 15 Drawing Sheets

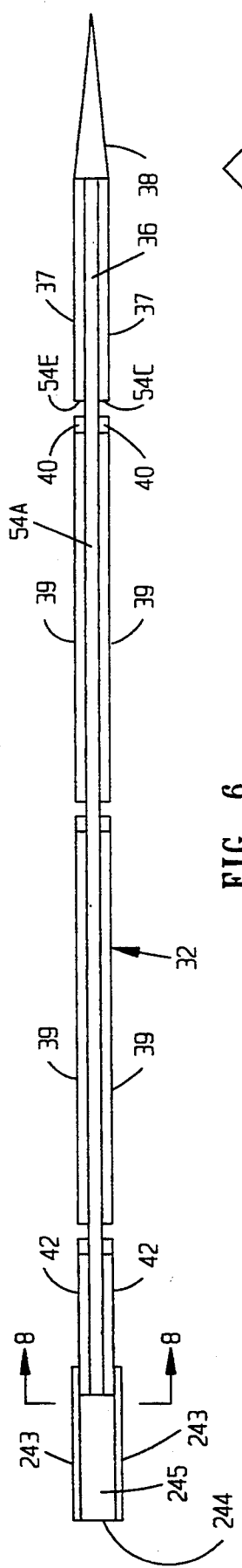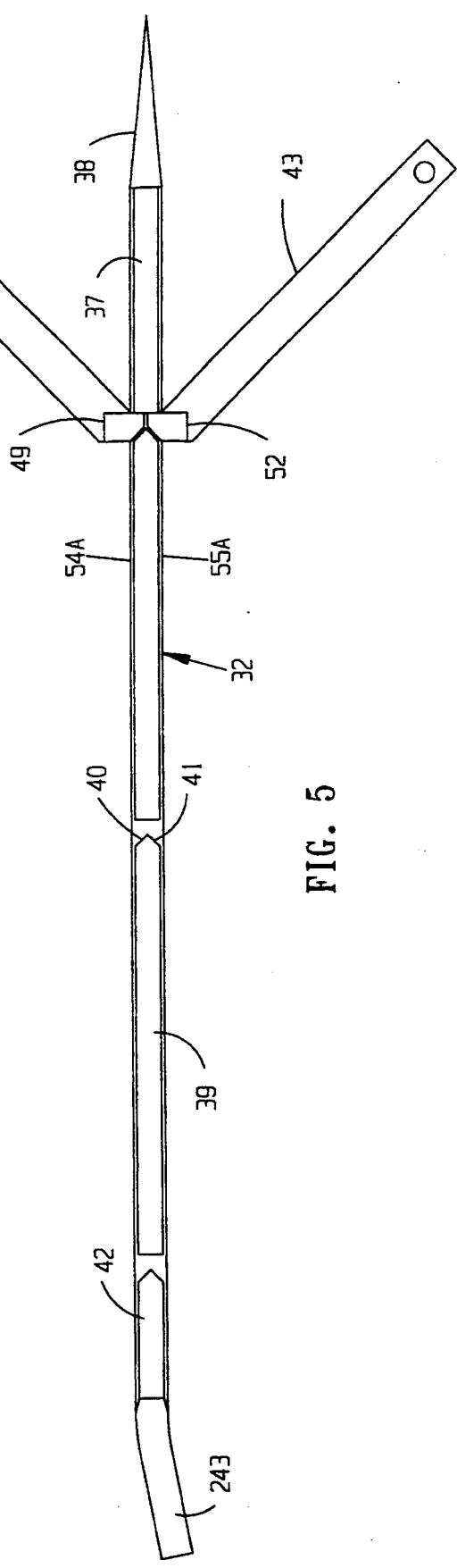
FIG. 6
FIG. 5

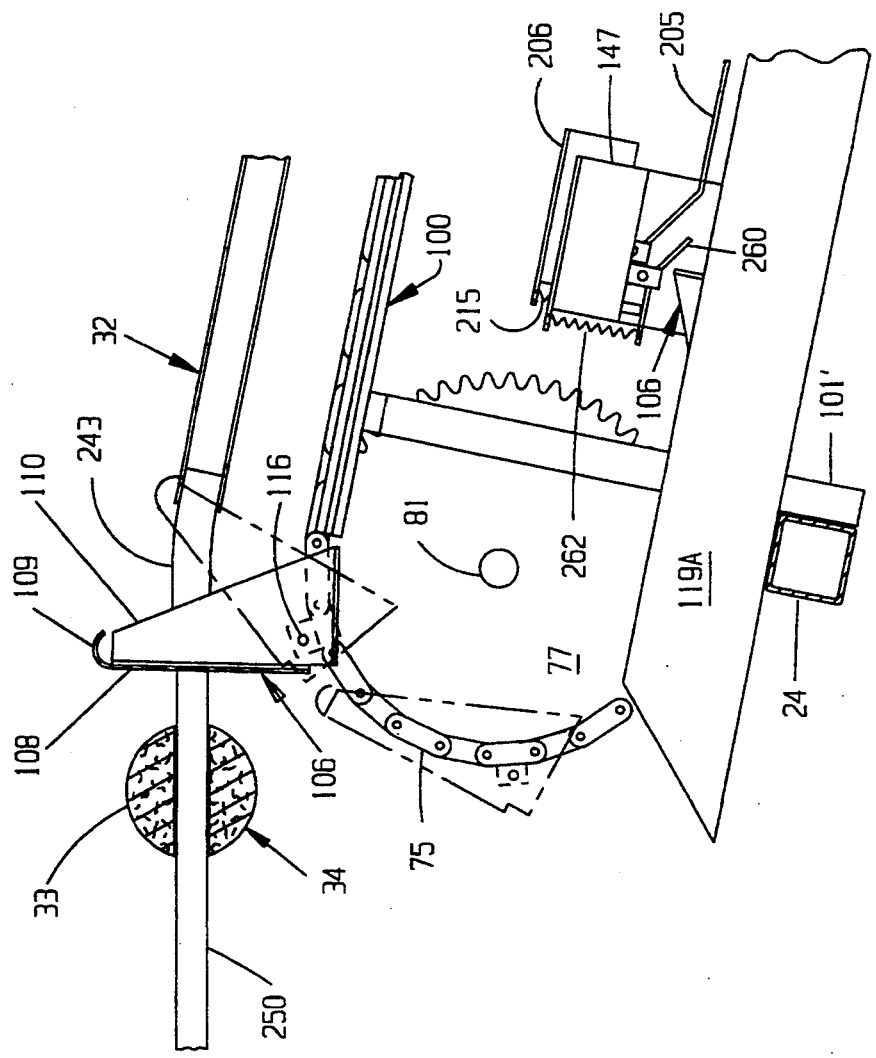
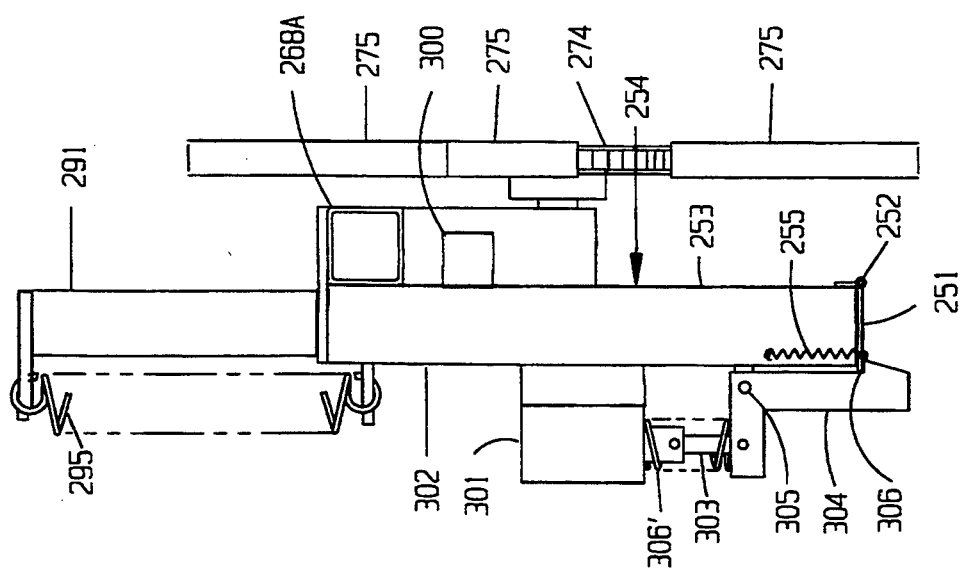
FIG. 14
FIG. 13

TOBACCO HARVESTER

This invention relates to a tobacco harvester and, more particularly, to a tobacco harvester in which tobacco plants are automatically loaded on a tobacco stick or the like with an increased throughput.

Various types of tobacco harvesting machines are disclosed in U.S. Pat. Nos. 3,347,030 to Woods, 3,798,884 to Middleton, 3,855,762 to Middleton, 3,902,607 to Middleton, 3,997,066 to Thielen, 4,212,145 to Middleton, and 4,510,740 to Foster. Each of the aforesaid patents uses a floating spear, which is supported by supports that move away from the spear when a stalk or stem of a tobacco plant reaches each support. Each of the aforesaid patents has one or more disadvantages that prevent movement of the tobacco plants along the spear and onto a stick in a relatively short period of time so as to obtain maximum throughput.

The tobacco harvester of the present invention is capable of loading tobacco plants on a stick at a rate of about one plant every two seconds or faster. At the same time, the tobacco harvester of the present invention utilizes a unique centering means in which brittle leaves of a tobacco plant are minimally damaged when advanced onto a spear. This is accomplished through driving at least one of two centering belts utilized to center a stem or stalk of a tobacco plant on the spear.

The tobacco harvester of the present invention also feeds a tobacco plant, after it is impaled on the spear during one cycle of operation, along the entire remaining length of the spear and onto a tobacco stick or the like during the next cycle of operation. Therefore, quicker feeding of tobacco plants onto a stick or the like is accomplished by the tobacco harvester of the present invention.

The tobacco harvester of the present invention also is capable of not only automatically removing each stick after it is loaded with a selected number of tobacco plants but also automatically loading another stick to receive the next tobacco plant. This eliminates a worker having to load each stick in a position to receive tobacco plants from the spear.

The tobacco harvester of the present invention requires only two workers. One worker grasps each tobacco plant as it is being automatically severed and places each plant at a specific location to start a cycle of operation because of the plant's presence being sensed.

The other worker places an empty stick within an automatic stick loader, spreads the plants, if necessary, along the stick when there is not automatic positioning of the tobacco plants along the stick at a selected distance between adjacent tobacco plants, and disposes of a filled stick that has been loaded with tobacco plants by the tobacco harvester of the present invention. The spreading of the plants occurs as each is loaded on the stick. If there is not automatic stick loading, the other worker also removes the loaded stick from its support and replaces it with an empty stick.

An object of this invention is to provide an improved tobacco harvester.

Other objects of this invention will be readily perceived from the following description, claims, and drawings.

The attached drawings illustrate a preferred embodiment of the invention, in which:

FIG. 5 is a right side elevational view of the spear and one pair of support arms for the spear;

FIG. 6 is a top plan view of the spear of FIG. 5 without any support arms for the spear;

FIG. 13 is a fragmentary end elevational view of the tobacco plant advancing mechanism of FIG. 12 and taken along line 13—13 of FIG. 12;

FIG. 14 is an enlarged fragmentary right side elevational view of the rear portion of the advancing means of FIG. 3 and showing a stem or stalk of a tobacco plant being advanced onto a tobacco stick from a spear;

Figure 1:
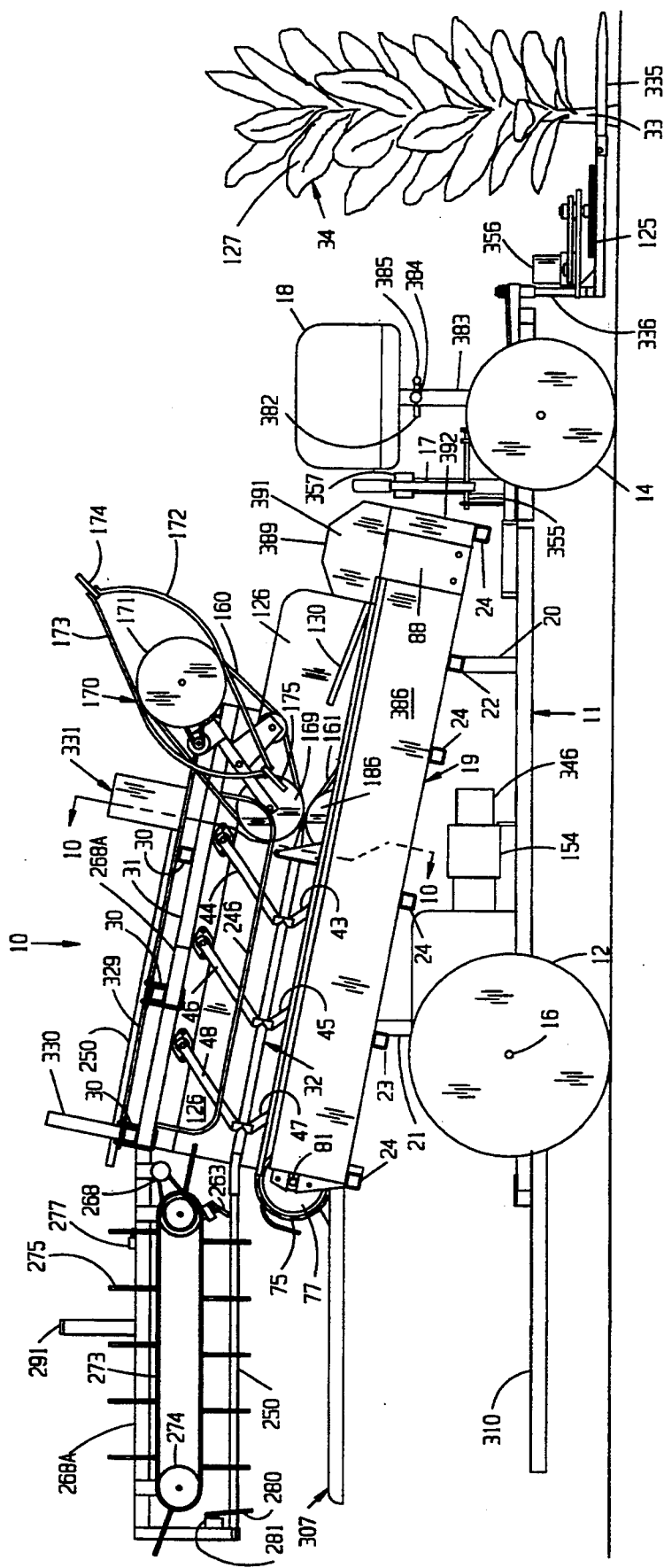
FIG. 1 is a right side elevational view of a tobacco harvester of the present invention.

Referring to the drawings and particularly FIG. 1, there is shown a tobacco harvester 10. The tobacco harvester 10 includes a chassis 11 supported by a pair of rear drive wheels 12 and a pair of front steerable wheels 14. The rear drive wheels 12 are driven from a hydraulic motor 15 (see FIG. 19) through a chain drive (not shown) and a sprocket (not shown) on a differential housing (not shown) to a rear axle 16 (see FIG. 1) for the rear drive wheels 12. The front wheels 14 are steerable through a pivotally mounted steering lever 17 adjacent a seat 18, which is supported by the chassis 11 and on which a worker is seated. Thus, the tobacco harvester 10 is self propelled.

A longitudinally inclined frame 19 is supported in spaced relation to the chassis 11 by a pair of vertical front posts 20 extending upwardly from the chassis 11 and a pair of vertical rear posts 21 extending upwardly from the chassis 11 for a greater distance than the front posts 20. The longitudinally inclined frame 19 includes a horizontal square tube 22 extending between the front posts 20 and secured to each. The longitudinally inclined frame 19 also has a horizontal square tube 23 extending between the vertical posts 21 and secured to each.

Figure 10:
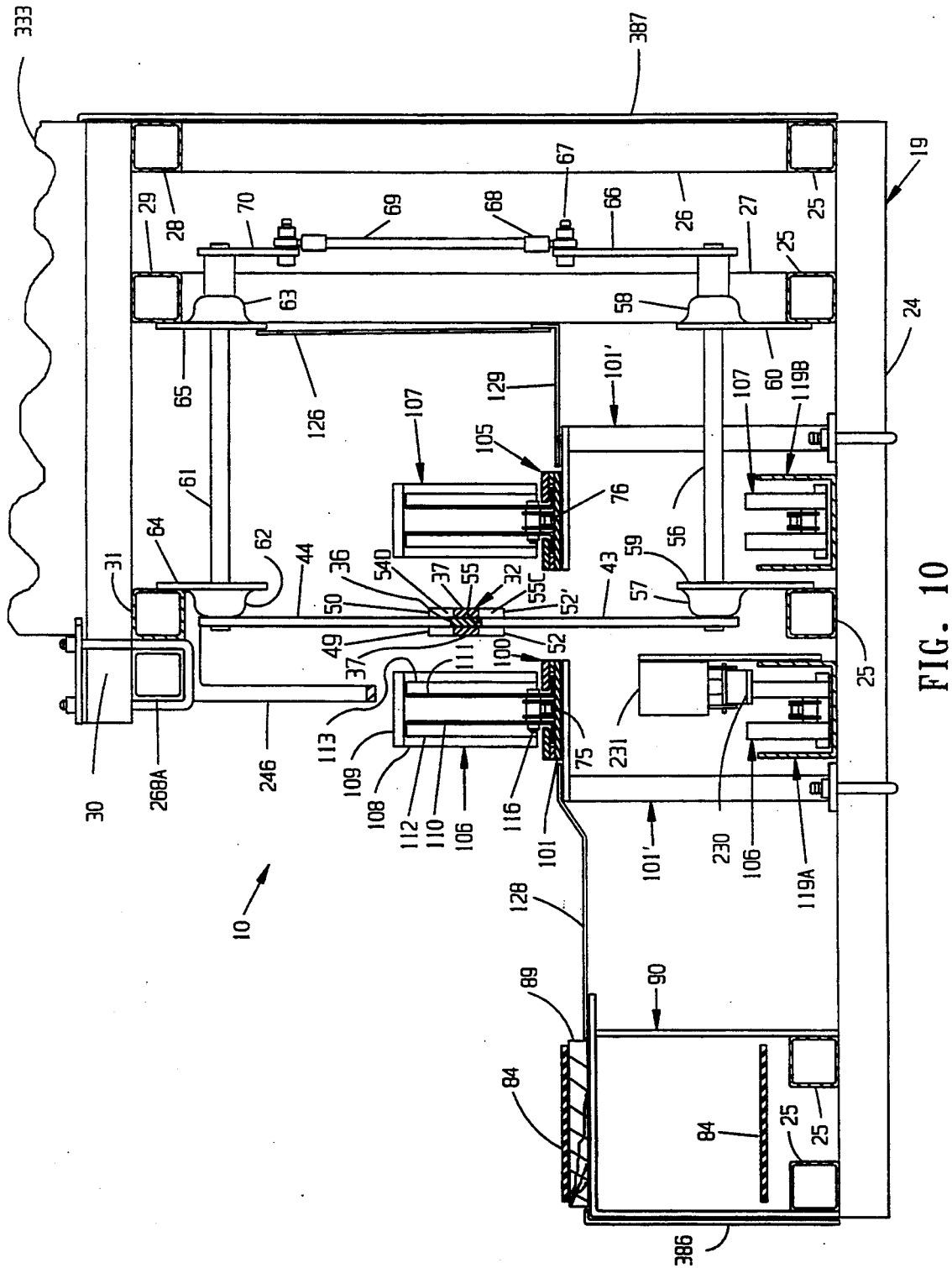
FIG. 10 is an enlarged fragmentary front sectional view, partly in elevation, of a portion of the tobacco harvester of FIG. 1 and taken along line 10—10 of FIG. 3.

In addition to the horizontal square tubes 22 and 23, the longitudinally inclined frame 19 has four other horizontal square tubes 24 with the horizontal square tubes 22-24 being joined to each other through a plurality of horizontal square tubes 25 (see FIG. 10). The horizontal square tubes 25 are shown mounted on the top surface of one of the horizontal square tubes 24. As shown in FIG. 1, the horizontal square tubes 22-24 are in a plane inclined to the chassis 11 with this plane preferably being at 11° to the horizontal.

The longitudinally inclined frame 19 has a plurality of vertical square tubes 26 (see FIG. 10) extending upwardly from one of the horizontal square tube 25 and a plurality of vertical square tubes 27 extending upwardly from another of the horizontal square tubes 25. The upper ends of the vertical square tubes 26 are secured to a longitudinally inclined square tube 28, and the upper ends of the vertical square tubes 27 are secured to a longitudinally inclined square tube 29.

The longitudinally inclined square tubes 28 and 29 have four horizontal square tubes 30 supported thereon in a cantilever arrangement so that each of the four horizontal square tubes 30 is a cantilever beam. A longitudinally inclined square tube 31 is supported by the four horizontal square tubes 30.

Figure 3:
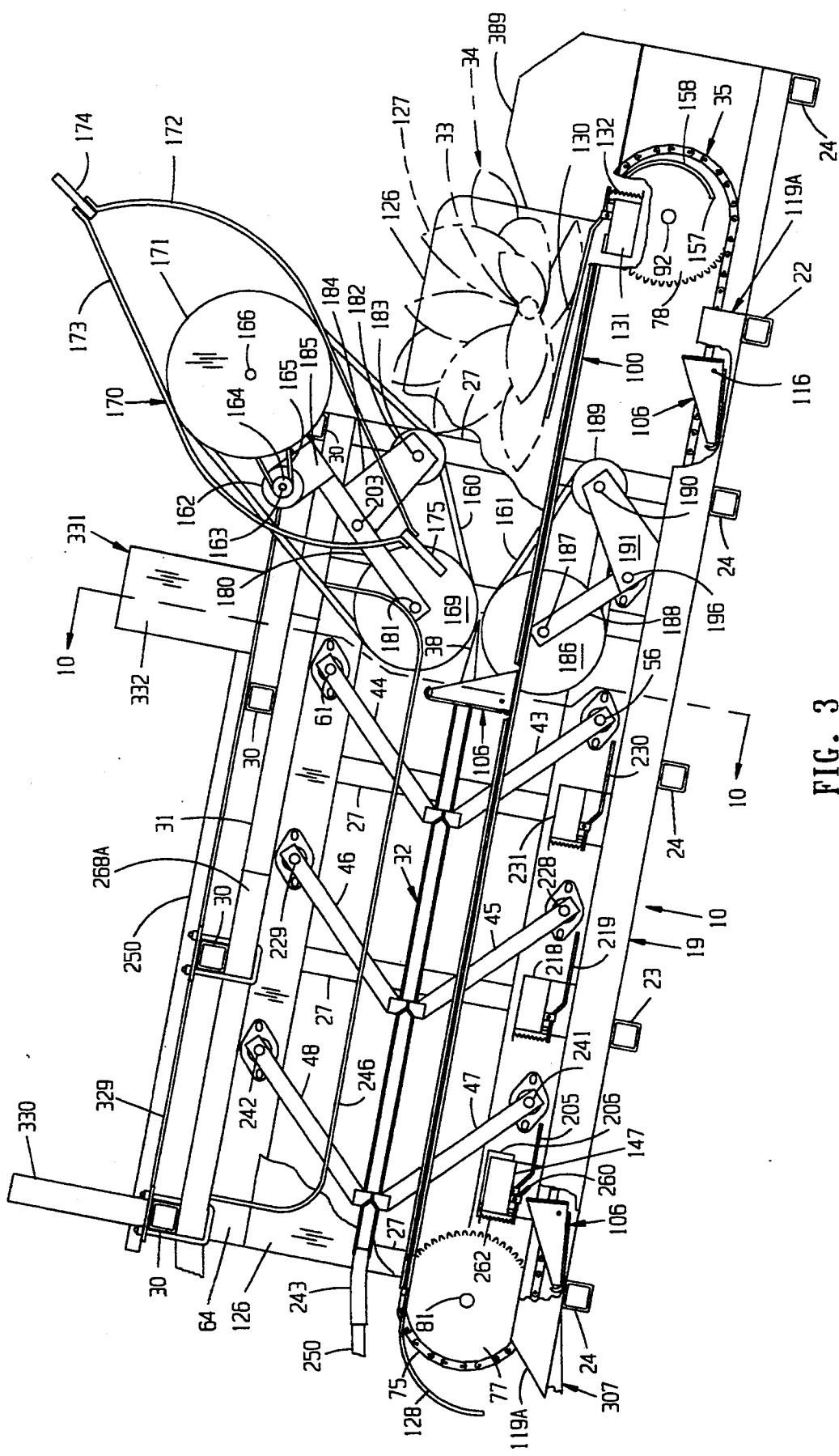
FIG. 3 is an enlarged right side elevational view of a portion of the tobacco harvester of FIG. 1 showing a spear, centering means, and advancing means for advancing each plant along the spear.

As shown in FIG. 3, the longitudinally inclined frame 19 of the tobacco harvester 10 includes a spear 32 for passing through a stalk or stem 33 (see FIG. 14)of a tobacco plant 34 (see FIG. 3) as the plant 34 is advanced from right to left in FIG. 3 by first advancing means 35. The spear 32 (see FIG. 6) includes a main longitudinally extending plate 36 having a pair of side plates 37 welded to its sides adjacent its front end.

Each of the side plates 37 has a ground front end to enable a conical shaped end portion 38 to fit thereover and be welded thereto. One suitable example of the pointed end portion 38 is a tobacco spear. If desired, the front ends of the main plate 36 and the side plates 37 could be machined, for example, to a conical hardened point, and the conical shaped end portion 38 omitted.

Figure 7:
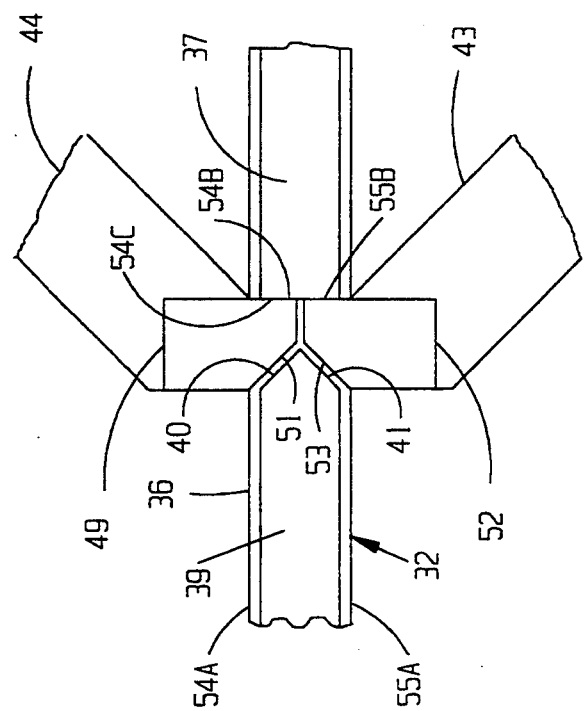
FIG. 7 is an enlarged fragmentary right side elevational view showing a portion of the spear supported by two support arms.

The main plate 36 has a first pair of side plates 39 welded to opposite sides thereof with each of the side plates 39 having an upper beveled surface 40 (see FIG. 7) and a lower beveled surface 41 at its front end. A second pair of the side plates 39 (see FIG. 6) is welded to the sides of the main plate 36 and is longitudinally spaced rearwardly from the first pair of the plates 39 in the same manner as the first pair of the side plates 39 has its front ends spaced from the rear ends of the side plates 37.

The main plate 36 also has a pair of side plates 42 welded to opposite sides thereof and longitudinally spaced rearwardly from the rear ends of the second pair of the side plates 39. Each of the side plates 42 has its front end spaced from the rear end of one of the second pair of the side plates 39. Each of the side plates 42 has upper and lower beveled surfaces in the same manner as each of the side plates 39 has the upper beveled surface 40 (see FIG. 7) and the lower beveled surface 41.

Figure 9:
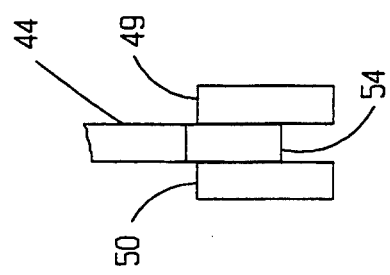
FIG. 9 is a fragmentary end elevational view of a portion of one of the support arms for the spear.

As shown in FIG. 3, the spear 32 is supported by a first pair of pivotally mounted arms 43 and 44, a second pair of pivotally mounted arms 45 and 46, and a third pair of pivotally mounted arms 47 and 48. As shown in FIG. 9, the pivotally mounted arm 44 has a pair of releasable locking plates 49 and 50, which are substantially parallel to each other, attached thereto.

The releasable locking plate 49 has a beveled surface 51 (see FIG. 7)spaced from the upper beveled surface 40 on one of the first pair of the side plates 39. The releasable locking plate 50 (see FIG. 9) has a similar beveled surface (not shown) spaced from the upper beveled surface 40 (see FIG. 7) of the other of the first pair of the side plates 39.

The pivotally mounted arm 43 is similarly formed with a pair of releasable locking plates 52 and 52' (see FIG. 10), which are substantially parallel to each other, with each having a beveled surface 53 (see FIG. 7) spaced from the lower beveled surface 41 of each of the first pair of the side plates 39.

The releasable locking plates 49 and 50 (see FIG. 9) on the pivotally mounted arm 44 loosely straddle the main plate 36 (see FIG. 7) to allow a surface 54 (see FIG. 9) of the pivotally mounted arm 44 to bear firmly against a top surface 54A (see FIG. 7) of the main plate 36 and a surface 54B of the releasable locking plate 49 to bear firmly against a rear edge 54C of one of the side plates 37 to aid in holding the spear 32 in alignment. The releasable locking plate 50 (see FIG. 9) has a surface 54D (see FIG. 10) corresponding to the surface 54B (see FIG. 7) of the releasable locking plate 49 to bear firmly against a rear edge 54E (see FIG. 6) of the other of the side plates 37.

The releasable locking plates 52 (see FIG. 10) and 52' of the pivotally mounted arm 43 loosely straddle the main plate 36 to allow a surface 55 (see FIG. 10) of the pivotally mounted arm 43 to bear firmly against a bottom surface 55A (see FIG. 7) of the main plate 36 and a surface 515B of the releasable locking plate 52 to bear firmly against the rear edge 54C of the one side plate 37 to aid in holding the spear 32 in alignment. The releasable locking plate 52' (see FIG. 10) has a surface 55C corresponding to the surface 55B (see FIG. 7) of the releasable locking plate 52 to bear firmly against the rear edge 54E (see FIG. 6) of the other side plate 37. This arrangement firmly supports the spear 32.

The pivotally mounted arms 45 (see FIG. 3) and 46 and the pivotally mounted arms 47 and 48 have similar cooperating releasable locking plates. Thus, as shown in FIG. 3, the spear 32 is firmly supported by the pivotally mounted arms 43-48.

As shown in FIG. 10, the pivotally mounted arm 43 is attached to one end of a shaft 56, which is supported in bearings 57 and 58, for rotation with the shaft 56 about its longitudinal axis. The bearing 57 is mounted on a plate 59, which is welded to one of the horizontal square tubes 25. The bearing 58 is mounted on a plate 60, which is welded to another of the horizontal square tubes 25 and extends across all of the vertical square tubes 27.

The pivotally mounted arm 44 is connected to one end of a shaft 61, which is supported in bearings 62 and 63, for rotation with the shaft 61 about its longitudinal axis. The bearing 62 is mounted on a plate 64, which is welded to the horizontal square tube 31. The bearing 63 is mounted on a plate 65, which is welded to the horizontal square tube 29 and extends across all of the vertical square tubes 27.

The other end of the shaft 56 is attached to a lower end of a crank arm 66, which rotates with the shaft 56 about its longitudinal axis. The crank arm 66 has its upper end connected through a bolt 67 and a rod end bearing 68 to a lower end of an adjustable mounting link 69, which has its upper end similarly connected to a lower end of a crank arm 70. The crank arm 70 has its upper end connected to the shaft 61 for rotation with the shaft 61 about its longitudinal axis.

Figure 11:
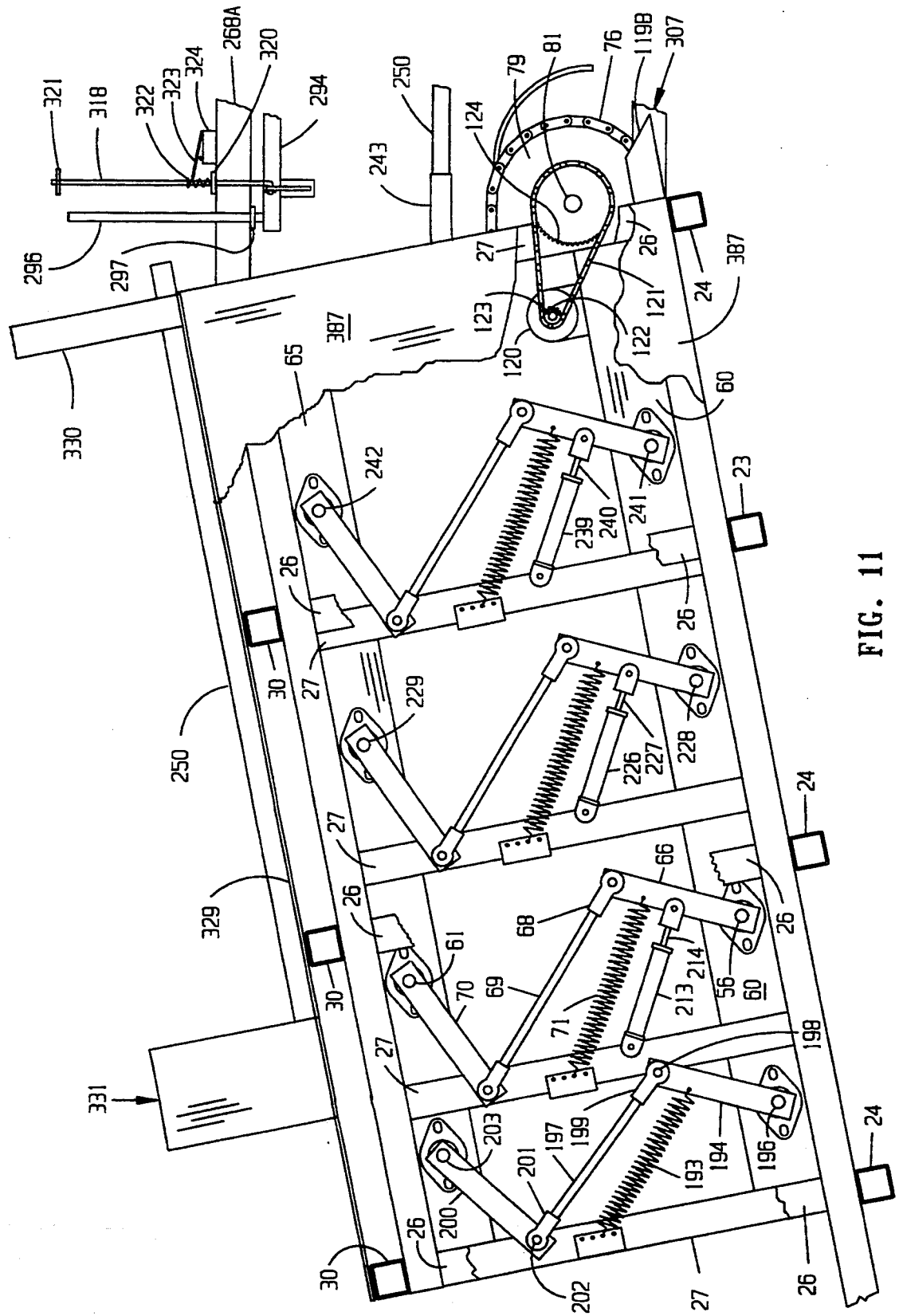
FIG. 11 is an enlarged left side elevational view of a portion of the tobacco harvester of FIG. 1 and taken from the opposite side of the tobacco harvester from that of FIG. 3.

As shown in FIG. 11, a spring 71, which has one end attached to the crank arm 66 and its other end secured to one of the vertical square tubes 27, continuously urges the crank arm 66 so that the shaft 56 rotates counterclockwise (as viewed in FIG. 11) and the shaft 61 rotates clockwise (as viewed in FIG. 11). This results in the pivotally mounted arms 43 and 44 being urged to the position of FIG. 3 because the shaft 56 rotates clockwise (as viewed in FIG. 3) and the shaft 61 rotates counterclockwise (as viewed in FIG. 3).

The pivotally mounted arms 45 and 46 are mounted and supported in the same manner as the pivotally mounted arms 43 and 44. The pivotally mounted arms 47 and 48 also are mounted and supported in the same manner as the pivotally mounted arms 43 and 44.

The first advancing means 35 (see FIG. 4) includes a pair of endless chains 75 and 76. The endless chains 75 and 76 are disposed on opposite sides of the spear 32 as shown in FIG. 10 with the chains 75 and 76 as close as possible to the spear 32.

The endless chain 75 passes around sprockets 77 (see FIG. 3) and 78. The endless chain 76 passes around sprockets 79 (see FIG. 11) and 80 (see FIG. 4).

The sprockets 77 (see FIG. 3) and 79 (see FIG. 11) are fixed to a shaft 81. The shaft 81 has its ends supported in flange bearings 82 (see FIG. 12).

A drum 83 also is fixed to the shaft 81 for rotation therewith. The drum 83 has an endless rubber belt 84 pass therearound.

Figure 4:
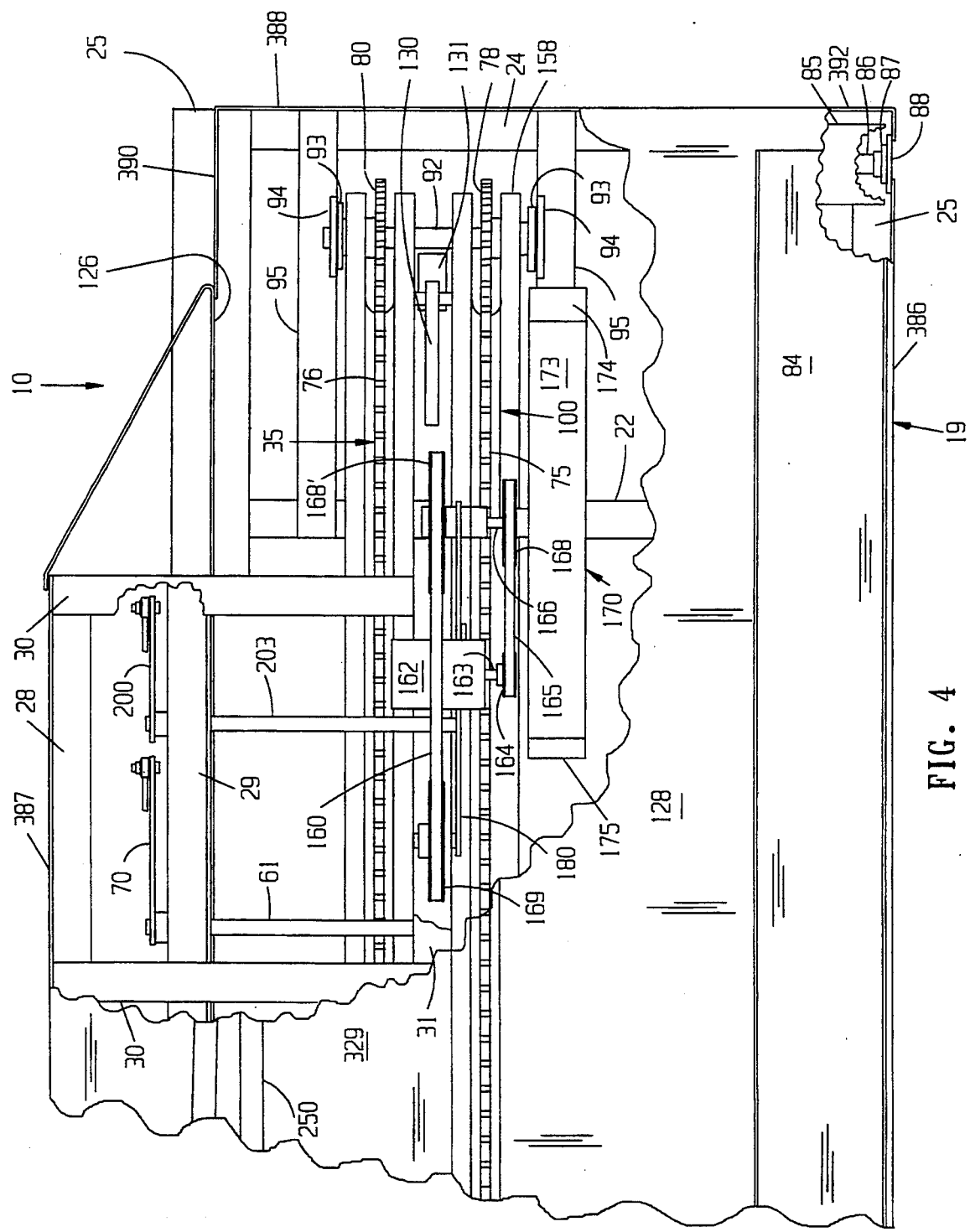
FIG. 4 is an enlarged top plan view of a portion of the tobacco harvester of FIG. 1.

The belt 84 also passes around a drum 85 (see FIG. 4). The drum 85 is fixed to a shaft 86, which has its ends rotatably mounted in flange bearings 87 (one shown). Each of the flange bearings 87 is supported on a vertical plate 88 (one shown). The plates 88 are mounted by bolts (not shown) to two of the square tubes 25 (see FIG. 10) with horizontal slots in the plates 88 for the bolts to tighten the belt 84.

A wooden board 89 is disposed beneath the upper portion of the endless belt 84 between the drums 83 (see FIG. 12) and 85 (see FIG. 4). The wooden board 89 (see FIG. 10) is supported by a plurality of longitudinally spaced U-shaped supports 90. Each of the U-shaped supports 90, which are formed of strap metal, has its legs welded to two of the horizontal square tubes 25.

A shaft 92 (see FIG. 4), which has the sprockets 78 and 80 fixed thereto, has its ends supported in flange bearings 93. Each of the flange bearings 93 is mounted on a vertical plate 94. Each of the vertical plates 94 is mounted by bolts (not shown) on a horizontal square tube 95 to provide adjustment for tightening the chains 75 and 76. The two horizontal square tubes 95 extend between the horizontal square tube 22 and the forwardmost of the horizontal square tubes 24 in FIG. 3.

The chain 75 (see FIG. 10) rides in a track 100. The track 100 includes a base plate 101, which is supported by a plurality of track supports 101'. The track supports 101' are longitudinally spaced from each other with each of the track supports 101' being supported on one of the horizontal square tubes 22 (see FIG. 1), 23, and 24.

Figure 24:
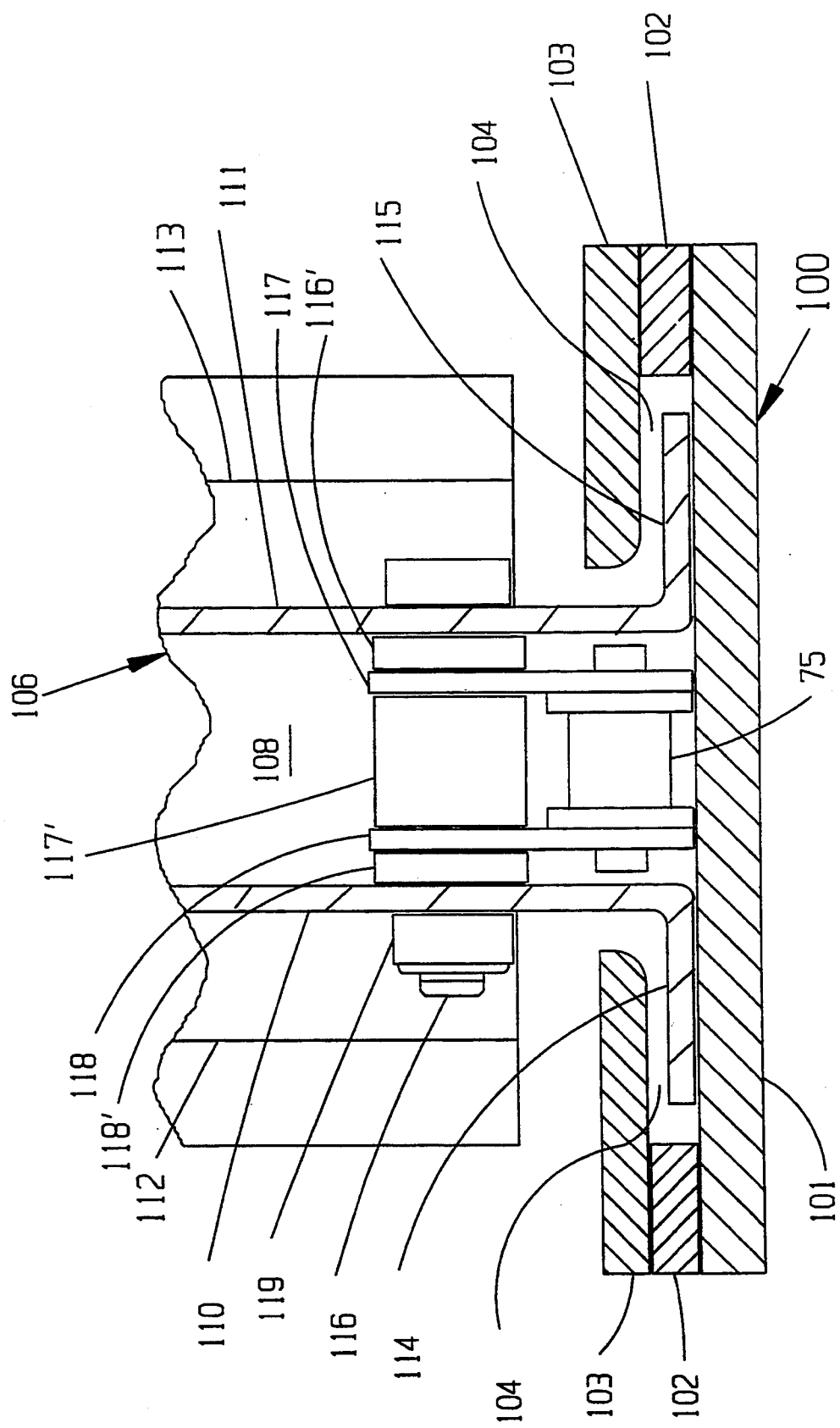
FIG. 24 is an enlarged end fragmentary sectional view, partly in elevation, of a portion of a track and a plant engaging flight supported thereby.

The base plate 101 (see FIG. 24) has a pair of narrow strip spacers 102 secured to its upper surface and extending along each side. Each of the narrow strip spacers 102 has a plate 103, which is wider than the narrow strip spacer 102 that it overlies, secured to its upper surface and spaced from the base plate 101 to form a guide space 104 therebetween.

The chain 76 (see FIG. 10) rides in a track 105. The track 105 is formed in the same manner as the track 100.

The chain 75 (see FIG. 3) has three plant engaging fingers or flights 106 pivotally mounted thereon. The flights 106 are linearly spaced the same distance from each other along the chain 75. Each of the three flights 106 is shown in FIG. 3 at a stopping position. Thus, one of the flights 106 is at an upper position, the second of the flights 106 is at a lower left position, and the third of the flights 106 is at a lower right position.

The chain 76 (see FIG. 10) has three pivotally mounted plant engaging fingers or flights 107, which are the same as the flights 106, attached thereto. Each of the flights 107 is always at the same position as a corresponding one of the flights 106.

The flight 106 includes a plant engaging plate 108 (see FIG. 14) having a curved end 109. A pair of plates 110 and 111 (see FIG. 10) is attached to the plant engaging plate 108 by having a flange 112 of the plate 110 and a flange 113 of the plate 111 welded thereto. The plate 110 has a flange 114 (see FIG. 24) riding in one of the guide spaces 104 of the track 100, and the plate 111 has a flange 115 riding in the other of the guide spaces 104 of the track 100.

The flight 106 is pivotally connected to the chain 75 through having a bolt 116 extend through aligned openings in the plate 111, a plastic spacer 116', a tab 117 on one side of the chain 75, a plastic spacer 117', a tab 118 on the other side of the chain 75, a plastic spacer 118', and the plate 110. The bolt 116 is retained in position by a lock nut 119.

As shown in FIG. 10, the flights 106 are supported in a U-shaped trough 119A when moving from the sprocket 77 (see FIG. 3) to the sprocket 78. The U-shaped trough 119A is supported on the horizontal square tubes 22-24 except for the rightmost square tube 24. The plant engaging plate 108 rides on the base of the U-shaped trough 119A (see FIG. 10).

A U-shaped trough 119B, which is the same as the U-shaped trough 119A, is supported in the same manner. The U-shaped trough 119B supports the flights 107 in the same manner as the flights 106 are supported by the U-shaped trough 119A.

The chains 75 and 76 are driven from a hydraulic motor 120 (see FIG. 11) through a chain 121 meshing with a sprocket 122 on a shaft 123 of the motor 120 and a sprocket 124 on the shaft 81. The shaft 81 also has the sprocket 77 (see FIG. 3), which meshes with the chain 75, the sprocket 79 (see FIG. 11), which meshes with the chain 76, and the drum 83 (see FIG. 12) thereon.

When the stalk 33 (see FIG. 14) of the tobacco plant 34 (see FIG. 1) is severed by a saw blade 125, a worker, who is seated on the seat 18, grasps the tobacco plant 34 and positions it with the stalk or stem 33 closest to a side wall 126. The side wall 126 is supported by the vertical square tubes 27 as shown in FIG. 10.

The tobacco plant 34 (see FIG. 1) is positioned with its leaves 127 resting on the chains 75 (see FIG. 4) and 76 and the belt 84. A sheet metal cover 128 (see FIG. 10) extends between the U-shaped supports 90 and the track supports 101' for the track 100 and has the leaves 127 (see FIG. 3) of the tobacco plant 34 also resting thereon. Likewise, a sheet metal cover 129 (see FIG. 10) extends between the track supports 101' for the track 105 and the side wall 126, which is supported by the vertical square tubes 27.

When the tobacco plant 34 (see FIG. 3) is so disposed, a pivotally mounted switch arm 130 of a switch 131 is moved against the force of a spring 132. The spring 132 continuously urges the pivotally mounted switch arm 130 to the position of FIG. 1.

The pivotally mounted switch arm 130 (see FIG. 18) is connected to a movable contact 133 of the switch 131 so as to move the movable contact 133 into engagement with a contact 134, which has 12 volts supplied thereto from a battery (not shown), when the pivotally mounted switch arm 130 is moved to the position of FIG. 3. The voltage is supplied to the contact 134 (see FIG. 18) through a movable contact 135 of a deenergized relay 136, a contact 137 of the relay 136, a lead 138, a movable contact 139 of a deenergized relay 140, and a lead 141.

This causes a coil 142 of the relay 136 to be energized whereby the movable contact 135 of the relay 136 is moved to engage a contact 143 of the relay 136, and a movable contact 144 of the relay 136 engages a contact 145. The contact 145 is connected to a contact 146 of a switch 147 with the battery (not shown) supplying 12 volts to the contact 146 through a movable contact 148 of the switch 147. Thus, this voltage provides a hold circuit for the coil 142 of the relay 136 through a lead 149. This is necessary because the tobacco plant 34 (see FIG. 3) does not remain in engagement with the switch arm 130.

Figures 18, 19:
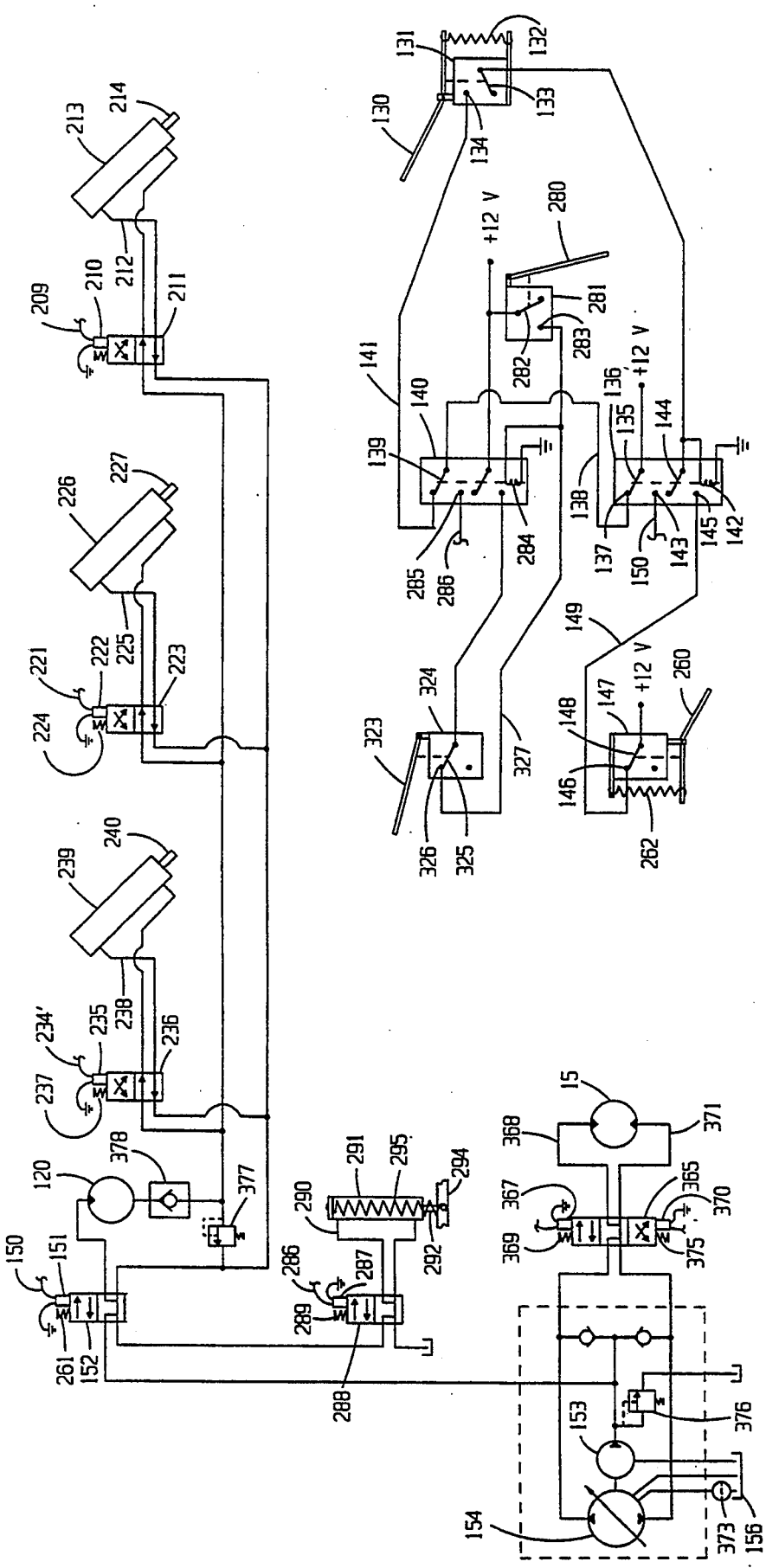
FIG. 18 is a schematic view of an electrical circuit for controlling the operation of the tobacco harvester of FIG. 1.
FIG. 19 is a schematic hydraulic circuit for controlling retraction of the spear support arms, the automatic stick loading mechanism of FIG. 15, and propulsion of the tobacco harvester of FIG. 1.

The contact 143 (see FIG. 18) of the relay 136 is connected through a lead 150 to energize a solenoid 151 (see FIG. 19). Energization of the solenoid 151 shifts the position of a hydraulic control valve 152 so that hydraulic fluid is supplied to the hydraulic motor 120 from a constant displacement hydraulic pump 153, which is coincident with a variable displacement pump 154 and communicates with a reservoir 156.

The activation of the motor 120 drives the chains 75 (see FIG. 10) and 76. This moves the flight 106 (see FIG. 3) at the lower right position to the upper position, the flight 106 at the lower left position to the lower right position, and the flight 106 at the upper position to the lower left position.

The movement of the flight 106 from the lower right position results in the flanges 114 (see FIG. 24) and 115 on the plates 110 and 111, respectively, of the flight 106 engaging a bump end 157 (see FIG. 3) of a curved end portion 158 of the track 100. This causes counterclockwise (as viewed in FIG. 3) pivoting of the flight 106 about the bolt 116 to position the flight 106 in the same vertical position as shown for the flight 106 at the upper position in FIG. 3. This positioning of the flight 106 (see FIG. 24) occurs so that the flanges 114 and 115 of the plates 110 and 111 of the flight 106 will enter the two guide spaces 104 of the track 100. Similarly, the flight 107 (see FIG. 10), which is connected to the chain 76 at the same position as the corresponding flight 106 is attached to the chain 75, will likewise pivot about a bump end (not shown) of a curved end portion (not shown) of the track 105.

This disposition of the flights 106 and 107 so that the engaging plate 108 of each of the flights 106 and 107 will be vertical enables the flights 106 and 107 to move the tobacco plant 34 (see FIG. 3) to the left. As the plant 34 is advanced to the left in FIG. 3, the leaves 127 of the tobacco plant 34 enter between two centering, endless belts 160 and 161.

The belt 160 is powered from an electric motor 162, which has 12 volts supplied to it from the battery (not shown) when the coil 142 (see FIG. 18) of the relay 136 is energized because the lead 150 not only goes to the solenoid 151 (see FIG. 19) but also to the motor 162 (see FIG. 3). Thus, the motor 162 always drives the belt 160 whenever the coil 142 (see FIG. 18) of the relay 136 is energized.

As shown in FIG. 4, the output of a shaft 163 of the motor 162 is transmitted through a sheave 164 on the shaft 163 to an endless belt 165. The belt 165 drives a shaft 166 through a first sheave 168 on the shaft 166. The shaft 166 has a second sheave 168' thereon to receive the belt 160 to drive the belt 160, which also passes around a sheave 169.

In addition to rotating the belt 160, the motor 162 also causes rotation of a paddle wheel 170. The paddle wheel 170 is fixed to the shaft 166.

The paddle wheel 170 includes a solid disc 171 (see FIG. 3) and two curved pieces 172 and 173 of sheet metal secured thereto. As the paddle wheel 170 rotates clockwise (as viewed in FIG. 3), one of the curved pieces 172 and 173 engages the brittle leaves 127 on the tobacco plant 34 and gently compresses them to urge them through the belts 160 and 161 to approach the pointed end portion 38 of the spear 32 in a centered relation thereto.

The paddle wheel 170 has a pair of fingers 174 and 175 diametrically disposed to each other. The fingers 174 and 175 are secured to the curved pieces 172 and 173 at the connections of the fingers 174 and 175 to each other. The speed of the motor 162 and the size relation of the sheaves 164 and 168 (see FIG. 4) are selected to rotate the paddle wheel 170 at a selected rate, which is preferably one-half of a revolution of the paddle wheel 170 in two seconds, to synchronize rotation of the paddle wheel 170 with the flights 106 (see FIG. 10) and 107.

The sheave 169 (see FIG. 3) is rotatably mounted on a bar 180 through a bearing (not shown) disposed on a stud 181, which is fixed to the bar 180. An idler sheave 182 is mounted through a bearing (not shown) on a stud 183 fixed to and extending from a bracket 184, which is adjustably mounted on the bar 180 to adjust the tension of the endless belt 160. The motor 162 also is supported on the bar 180 through a bracket 185.

The endless belt 161 passes around a sheave 186, which is mounted through a bearing (not shown) on a stud 187 fixed to a bar 188. The endless belt 161 also passes around an idler sheave 189, which is rotatably mounted through a bearing (not shown) on a stud 190. The stud 190 is fixed to and extends from a bracket 191, which is adjustably supported on the bar 188 to adjust the tension of the endless belt 161.

The centering sheaves 169 and 186 are continuously urged towards each other to center, relative to the end of the pointed end portion 38 of the spear 32, any size of the stalk 33 of the tobacco plant 34 and the mass of the leaves 127 (see FIG. 1) of the tobacco plant 34. A spring 193 (see FIG. 11) continuously urges the centering sheaves 169 (see FIG. 3) and 186 towards each other.

The spring 193 (see FIG. 11) has one end connected to a crank arm 194 and its other end attached to one of the vertical square tubes 27. The crank arm 194 has its lower end connected to a shaft 196, which also is connected to the bar 188 (see FIG. 3). Thus, rotation of the shaft 196, which is supported in a manner similar to that of the shaft 56 (see FIG. 10), is produced by the spring 193 (see FIG. 11) moving the crank arm 194 to create pivotal motion of the bar 188 (see FIG. 3).

The crank arm 194 (see FIG. 11) has its upper end connected to the lower end of an adjustable connecting rod 197 through a bolt 198 and a rod end bearing 199. The adjustable connecting rod 197 has its upper end connected to the lower end of a crank arm 200 through a rod end bearing 201 and a bolt 202. The crank arm 200 has its end supporting a shaft 203, which also is connected to the bar 180 (see FIG. 3). Accordingly, the spring 193 (see FIG. 11) continuously urges the crank arm 194 to rotate the shaft 196 counterclockwise in FIG. 11 and clockwise in FIG. 3 to move the bar 180 (see FIG. 3) so that the sheave 186 is continuously urged towards the sheave 169.

Likewise, the force of the spring 193 (see FIG. 11) causes the shaft 203 to rotate clockwise in FIG. 11 and counterclockwise in FIG. 3 so that the sheave 169 (see FIG. 3) is moved toward the sheave 186. Thus, the sheaves 169 and 186 are continuously urged towards each other by the spring 193 (see FIG. 11).

When the flight 106 (see FIG. 3) at the lower right position of FIG. 3 moves to the upper position, movement of the flight 106 from the lower left position to the lower right position occurs at the same time as does movement of the flight 106 from the upper position to the lower left position. As the flight 106 moves to the left from the upper position of FIG. 3, the pivotally mounted arms 43 and 44 are initially moved away from the spear 32. This allows the stem or stalk 33 of the tobacco plant 34 and the leaves 127 of the tobacco plant 34 to be moved past the pivotally mounted arms 43 and 44.

Movement of the pivotally mounted arms 43 and 44 away from the spear 32 is accomplished through the flight 106 moving from the lower left position and the top (as viewed with the flight 106 in the lower left position in FIG. 3) edge of the flange 115 (see FIG. 24) of the flight 106 initially engaging a pivotally mounted switch arm 205 (see FIG. 3) of a switch 206. Pivotal movement of the pivotally mounted switch arm 205 of the switch 206 moves a movable contact 207 (see FIG. 20), which has 12 volts applied thereto from the battery (not shown), into engagement with a contact 208 of the switch 206.

The contact 208 is connected through a lead 209 to energize a solenoid 210 (see FIG. 19). Energization of the solenoid 210 shifts a hydraulic control valve 211 so that hydraulic fluid is supplied under pressure from the pump 153 through a line 212 to a cylinder 213 to extend its piston rod 214 therefrom. This extension of the piston rod 214 from the cylinder 213 rotates the crank arm 66 (see FIG. 11) and the shaft 56 clockwise (as viewed in FIG. 11) about the axis of the shaft 56 to overcome the force of the spring 71; this also causes counterclockwise (as viewed in FIG. 11) rotation of the shaft 61. This produces counterclockwise (as viewed in FIG. 3) pivoting of the pivotally mounted arm 43 (see FIG. 3) and clockwise (as viewed in FIG. 3) pivoting of the pivotally mounted arm 44. As a result, the pivotally mounted arms 43 and 44 no longer support the spear 32 and allow the tobacco plant 34, which is being pushed by the flight 106, to move along the spear 32 past the pivotally mounted arms 43 and 44 while the pivotally mounted arms 45 and 46 and the pivotally mounted arms 47 and 48 continue to support the spear 32.

Figure 20:
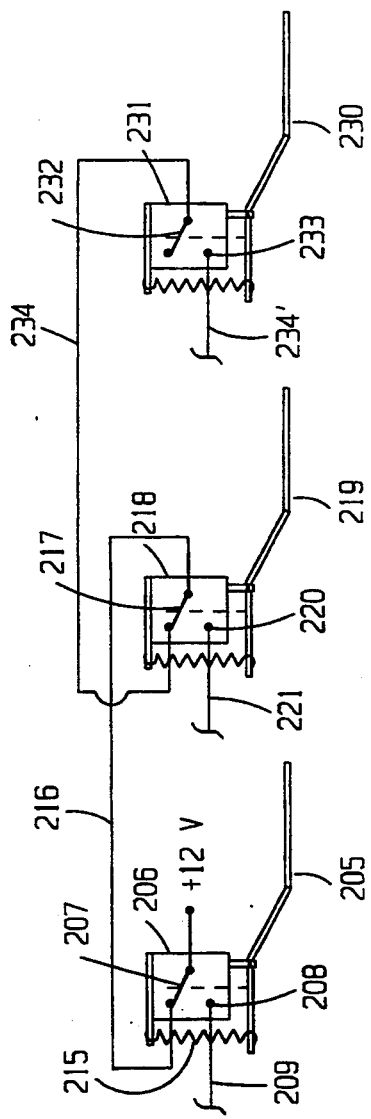
FIG. 20 is a schematic electrical circuit for controlling retraction of the spear support arms.

As the flight 106 (see FIG. 3) moves from the lower left position towards the lower right position, the top edge of the flange 115 (see FIG. 24) of the flight 106 ceases to engage the pivotally mounted switch arm 205 (see FIG. 3) so that the movable contact 207 (see FIG. 20) of the switch 206 is returned to its position of FIG. 20 by a spring 215 acting on the pivotally mounted switch arm 205. This causes 12 volts to be supplied from the battery (not shown) through the movable contact 207 and a lead 216 to a movable contact 217 of a switch 218.

The switch 218 has its pivotally mounted switch arm 219 engaged by the top edge of the flange 115 (see FIG. 24) of the flight 106 shortly after the top edge of the flange 115 of the flight 106 ceases to engage the pivotally mounted switch arm 205 (see FIG. 3) of the switch 206. If the pivotally mounted switch arm 219 should be engaged before the pivotally mounted switch arm 205 ceases to engage the top edge of the flange 115 (see FIG. 24) of the flight 106, there will be no voltage on the lead 216 (see FIG. 20) because the movable contact 207 of the switch 206 would not have returned to its position of FIG. 20. Therefore, this is a safety electrical interlock to prevent voltage from being supplied over the lead 216 and through the movable contact 217 of the switch 218 to a contact 220 until the pivotally mounted arms 43 (see FIG. 3) and 44 are again supporting the spear 32. Hydraulic flow from the pump 153 (see FIG. 19) must be sufficient to extend and retract the cylinder rod 214 during the brief interval so that the pivotally mounted arms 43 (see FIG. 3) and 44 open and close quickly as the tobacco plant 34 approaches and passes by the position at which the pivotally mounted arms 43 and 44 support the spear 32 when the pivotally mounted arms 43 and 44 are in their closed position.

The contact 220 (see FIG. 20) is connected through a lead 221 to energize a solenoid 222 (see FIG. 19). Energization of the solenoid 222 shifts the position of a hydraulic control valve 223 against the force of a spring 224. Movement of the hydraulic control valve 223 from its position of FIG. 19 by energization of the solenoid 222 results in hydraulic fluid being supplied from the pump 153 through a line 225 to a cylinder 226.

The hydraulic fluid pressure supplied through the line 225 to the cylinder 226 causes extension of its piston rod 227. As shown in FIG. 11, the piston rod 227 is connected in the same manner as the piston rod 214 of the cylinder 213 so that a shaft 228 rotates clockwise (as viewed in FIG. 11) to cause the pivotally mounted arm 45 (see FIG. 3) to pivot counterclockwise (as viewed in FIG. 3) away from the spear 32 and a shaft 229 rotates clockwise (as viewed in FIG. 3) to cause the pivotally mounted arm 46 to pivot clockwise (as viewed in FIG. 3).

Thus, when the pivotally mounted arms 45 and 46 are pivoted away from supporting the spear 32, the pivotally mounted arms 43 and 44 have already been returned to support the spear 32 because of the safety electrical interlock. This return of the pivotally mounted arms 43 and 44 is accomplished quickly by hydraulic flow in a reverse direction from the pump 153 (see FIG. 19) through the hydraulic control valve 211 after the solenoid 210 is deenergized.

Continued movement of the flight 106 (see FIG. 3) from the lower left position to the lower right position causes the top edge of the flange 115 (see FIG. 24) of the flight 106 to cease to engage the pivotally mounted switch arm 219 (see FIG. 3) of the switch 218 and engage a pivotally mounted switch arm 230 of a switch 231. Movement of the pivotally mounted switch arm 230 causes a movable contact 232 (see FIG. 20) of the switch 231 to be moved into engagement with a contact 233 of the switch 231.

If the pivotally mounted switch arm 219 of the switch 218 remains engaged with the top edge of the flange 115 (see FIG. 24) of the flight 106 so that the pivotally mounted arms 45 (see FIG. 3) and 46 have not returned to supporting the spear 32, there will be no voltage on a lead 234 (see FIG. 20) from the movable contact 217 of the switch 218 to the movable contact 232 of the switch 231. However, as soon as the pivotally mounted switch arm 219 of the switch 218 is no longer engaged by the top edge of the flange 115 (see FIG. 24) of the flight 106, voltage will be applied to the movable contact 232 (see FIG. 20) of the switch 231 through the lead 234.

The length of each of the pivotally mounted switch arms 205 (see FIG. 3), 219, and 230 determines the length of time that each is engaged by the top edge of the flange 115 (see FIG. 24) of the flight 106. The lengths are selected to be the same so that each of the pivotally mounted switch arms 205 (see FIG. 3), 219, and 230 is engaged by the top edge of the flange 115 (see FIG. 24) of the flight 106 for the same time period.

Voltage is applied from the movable contact 232 (see FIG. 20) through the contact 233 of the switch 231 and a lead 234' to energize a solenoid 235 (see FIG. 19). Energization of the solenoid 235 moves a hydraulic control valve 236 against the force of a spring 237 from its position of FIG. 19.

The shifting of the position of the hydraulic control valve 236 supplies hydraulic fluid from the pump 153 through a line 238 to a cylinder 239. Hydraulic fluid pressure within the cylinder 239 causes extension of its piston rod 240 to produce clockwise (as viewed in FIG. 11) rotation of a shaft 241 (see FIG. 11). This clockwise (as viewed in FIG. 11) rotation of the shaft 241 (see FIG. 11), which is connected to the pivotally mounted arm 47 (see FIG. 3), pivots the pivotally mounted arm 47 counterclockwise (as viewed in FIG. 3). Extension of the piston rod 240 (see FIG. 11) also rotates a shaft 242 counterclockwise (as viewed in FIG. 11) so that the pivotally mounted arm 48 (see FIG. 3), which has the shaft 242 connected thereto, pivots clockwise (as viewed in FIG. 3). Thus, the pivotally mounted arms 47 and 48 cease to engage the spear 32 after the pivotally mounted arms 45 and 46 are returned to their spear supporting position. This is insured by the safety electrical interlock of FIG. 20.

Accordingly, two of the three pairs of the pivotally mounted arms 43 (see FIG. 3) and 44, 45 and 46, and 47 and 48 are always supporting the spear 32. Furthermore, each of the pairs of the pivotally mounted arms 43 and 44, 45 and 46, and 47 and 48 moves away from the spear 32 to enable the flights 106 and 107 (see FIG. 10), which are moving from the upper position in FIG. 3 to the left, to advance the tobacco plant 34 along the spear 32.

Figure 8:
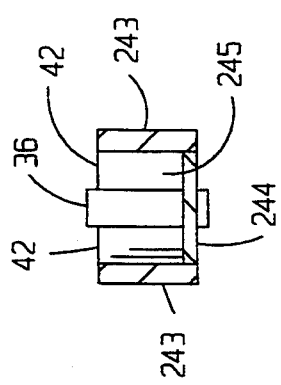
FIG. 8 is a cross sectional view of the spear of FIG. 6 and taken along line 8—8 of FIG. 6.

After the flight 106 has moved the tobacco plant 34 past the pivotally mounted arms 47 and 48, the stalk 33 (see FIG. 14) of the tobacco plant 34 moves along the side plates 42 (see FIG. 6) of the spear 32 and then over a pair of side plates 243, which are welded to the side plates 42. A bottom plate 244 is welded to the inner surfaces of the side plates 43 at their bottom edges as shown in FIG. 8 to form a recess 245.

During movement of the tobacco plant 34 (see FIG. 3) along the spear 32, a bar 246 holds the leaves 127 of the tobacco stalk 34 downwardly. This protects the leaves 127 during advancement of the tobacco plant 34 along the spear 32. The bar 246 has its ends fixed to the longitudinally inclined square tubes 31.

The recess 245 (see FIG. 8) receives one end of a stick 250 (see FIG. 1). As shown in FIG. 5, the side plates 243 and the bottom plate 244 (see FIG. 6) have a straight front portion and a rear inclined portion. This enables the stick 250 (see FIG. 1) to be disposed horizontally as shown in FIG. 1.

The stick 250 has its other end supported on a hinged flap 251 (see FIG. 13), which is connected by a hinge 252 to a side wall 253 of a U-shaped stick holder 254. A spring 255 continuously urges the hinged flap 251 to its tobacco stick support position.

As the stalk 33 (see FIG. 14) of the tobacco plant 34 is advanced onto the stick 250, the flight 106 ceases to remain in the position in which the engaging plate 108 is vertical because the flight 106 is no longer within the track 100 and the sprocket 77 causes the chain 75 to reverse its direction 180°. This results in the flight 106 moving from its solid line position of FIG. 14 to each of its phantom line positions in succession. After the direction of the chain 75 has been reversed 180°, the flight 106 is positioned shortly thereafter with the flight 106 at the lower left position of FIG. 3.

As the flight 106 (see FIG. 14) pivots clockwise about the bolt 116 from its solid line position of FIG. 14, the curved end 109 of the engaging plate 108 passes beneath the stalk 33 of the plant 34. Since the leaves 127 (see FIG. 1) of the tobacco plant 34 hang down, the curved end 109 (see FIG. 14) also passes under the leaves 127 (see FIG. 1) by pushing the leaves 127 upwardly without tearing the leaves 127.

As the flight 106 (see FIG. 3) reaches the lower left position of FIG. 3, the top edge of the flange 115 (see FIG. 24) of the flight 106 engages a pivotally mounted switch arm 260 (see FIG. 14) of the switch 147. The pivotally mounted switch arm 260 of the switch 147 is engaged by the flight 106 prior to the pivotally mounted switch arm 205 of the switch 206 being engaged by the flight 106.

Movement of the pivotally mounted switch arm 260 of the switch 147 causes the movable contact 148 (see FIG. 18) of the switch 147 to cease to engage the contact 146 to break the hold circuit for the coil 142 of the relay 136. Accordingly, the movable contacts 135 and 144 of the relay 136 return to their positions of FIG. 18 whereby the solenoid 151 (see FIG. 19) is deenergized and a spring 261 returns the hydraulic control valve 152 to its position of FIG. 19.

This shifting of the position of the hydraulic control valve 152 stops supply of pressurized hydraulic fluid to the motor 120 so that driving of the chains 75 (see FIG. 4) and 76 and the belt 84 is stopped and the cylinders 213 (see FIG. 19), 226, and 239 no longer have pressurized hydraulic fluid. Therefore, the cycle of operation is completed, and the pivotally mounted switch arm 260 (see FIG. 3) of the switch 147 is held by the flight 106 so that a spring 262 (see FIG. 18) cannot return the movable contact 148 to the position of FIG. 18.

With the hydraulic fluid no longer communicating with the cylinders 213 (see FIG. 11), 226, and 239, the spring 71 holds the crank arm 66 in the position of FIG. 11 in which the pivotally mounted arms 43 (see FIG. 3) and 44 support the spear 32. The pivotally mounted arms 45–48 are similarly spring biased to their spear support positions.

Figure 21:
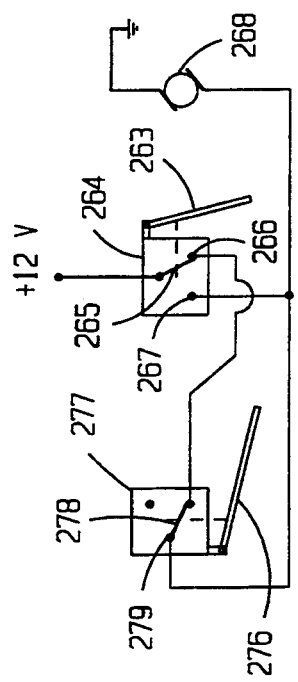
FIG. 21 is a schematic electrical circuit for controlling a motor for advancing tobacco plants along a stick on which they are loaded.

As each of the stalks or stems 33 (see FIG. 12) of the tobacco plants 34 is advanced onto the stick 250 by the flight 106 (see FIG. 3), a pivotally mounted switch arm 263 (see FIG. 12) of a switch 264 is engaged by the stalk or stem 33 of the tobacco plant 34. Movement of the pivotally mounted switch arm 263 of the switch 264 causes a movable contact 265 (see FIG. 21) of the switch 264 to move away from engagement with a contact 266 and into engagement with a contact 267 to supply 12 volts from the battery (not shown) to an electric motor 268, which is supported by a horizontal square tube 268A (see FIG. 12) by a support strap 268B. The horizontal square tube 268A has an inclined forward portion to be adjustably supported on the longitudinally inclined square tube 31 by bolts, for example.

The motor 268 has its shaft connected through a sprocket (not shown) to a chain 269, which passes around a sprocket 270. The sprocket. 270 is attached to a shaft 271, which has a sprocket 272 connected thereto. The sprocket 272 meshes with an endless chain 273, which also passes around a sprocket 274.

The chain 273 has a plurality of fingers or spokes 275, which are spaced equal linear distances from each other along the chain 273, extending outwardly therefrom and substantially perpendicular thereto. The activation of the motor 268 causes one of the fingers 275 to engage the stem or stalk 33 of the tobacco plant 34 and move it to the position shown in FIG. 12. Thus, the stalk or stem 33 of the tobacco plant 34 advances from a position just to the left of the flight 106 (see FIG. 3) in its upper position past the side plates 243 of the spear 32 and onto the stick 250 during a single cycle of operation. The energization of the motor 268 (see FIG. 12) is stopped when the next of the fingers 275 on the upper side of the endless chain 273 engages a pivotally mounted switch arm 276 of a switch 277, which is supported on the horizontal square tube 268A.

The movement of the pivotally mounted switch arm 276 of the switch 277 causes a movable contact 278 (see FIG. 21) of the switch 276 to cease to engage a contact 279. This breaks a circuit through the motor 268 because the movable contact 265 returned into engagement with the contact 266 of the switch 265 as soon as the stalk 33 (see FIG. 12) of the tobacco plant 34 ceased to engage the pivotally mounted switch arm 263 (see FIG. 21) of the switch 264.

As the stick 250 (see FIG. 122) has one of the stalks or stems 33 of the tobacco plants 34 advanced onto it during each cycle of operation, the stick 250 has each of the stalks or stems 33 of the tobacco plants 34 thereon advanced to the left. When the first of the stalks or stems 33 of the tobacco plants 34 on the stick 250 is advanced to engage a pivotally mounted switch arm 280 of a switch 281, a movable contact 282 (see FIG. 18) of the switch 281 is moved into engagement with a contact 283 of the switch 281. This supplies 12 volts from the battery (not shown) to a coil 284 of the relay 140 to energize the coil 284.

This energization of the coil 284 moves the movable contact 139 of the relay 140 into engagement with a contact 285 of the relay 140. When the coil 142 of the relay 136 is deenergized through its hold circuit being broken at the end of advancement of the stalk or stem 33 (see FIG. 3) of one of the plants 34 onto the spear 32 by the pivotally mounted switch arm 260 of the switch 147 being engaged by the flight 106 at the lower left position of FIG. 3, a voltage of 12 volts is supplied from the movable contact 135 (see FIG. 18) of the relay 136 over the lead 138 and through the movable contact 139 of the relay 140 to the contact 285 of the relay 140. This results in the voltage being supplied through a lead 286 to energize a solenoid 287 (see FIG. 19).

Energization of the solenoid 287 shifts the position of a hydraulic control valve 288 against the force of a spring 289. This shifting of the hydraulic control valve 288 allows hydraulic fluid to be supplied from the pump 153 through the hydraulic control valve 152 and the shifted hydraulic control valve 288 to a line 290. The supply of hydraulic fluid through the line 290 to a cylinder 291 causes extension of its piston rod 292. The cylinder 291, which is supported on the horizontal square tube 268A (see FIG. 15), moves a bar 294 downwardly against the upwardly extending force of a spring 295, which has its lower end connected to the bar 294 and its upper end connected to the cylinder 291. The bar 294 has a guide rod 296 attached thereto and extending upwardly therefrom through a guide 297 on the bottom of the horizontal square tube 268A.

Figure 16:
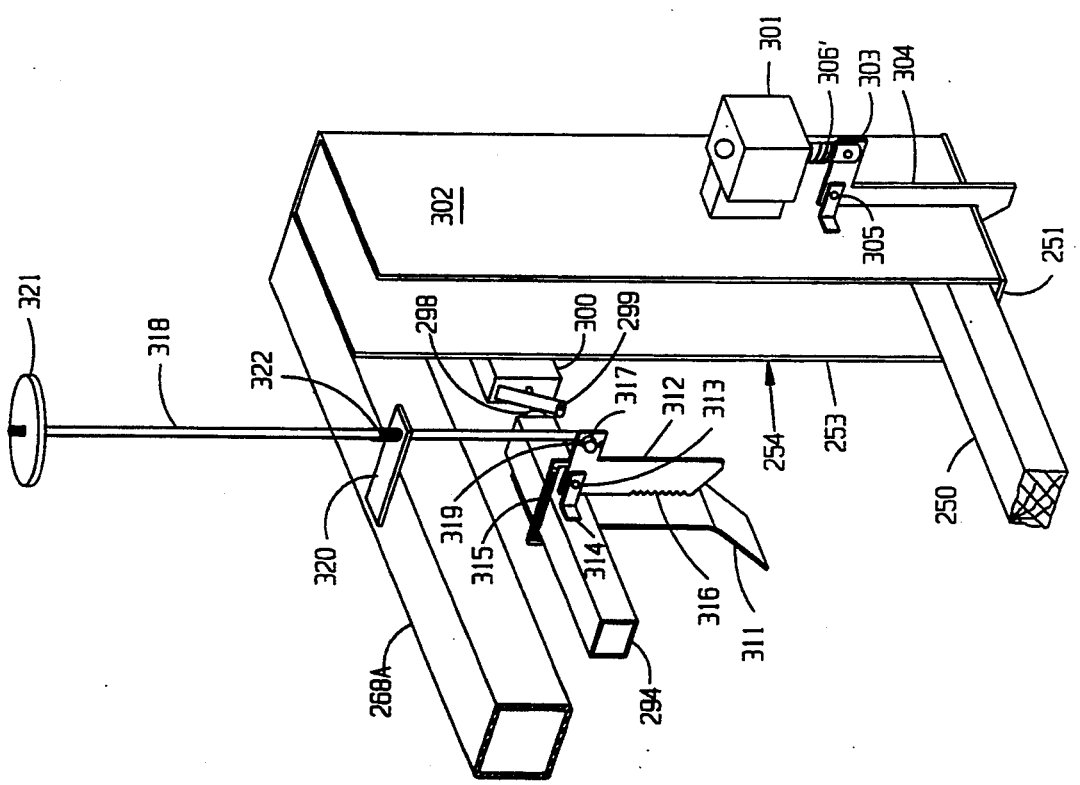
FIG. 16 is a perspective view of a portion of the automatic stick loading mechanism of FIG. 15.

As downward movement of the bar 294 begins, a rounded projection 298 on one end of the bar 294 engages a pivotally mounted switch arm 299 of a switch 300 (see FIG. 16), which is supported on the side wall 253 of the U-shaped stick holder 254, to close the switch 300. When the switch 300 is closed, the battery (not shown) supplies 12 volts to energize a solenoid 301, which is supported by a side wall 302 of the U-shaped stick holder 254.

Energization of the solenoid 301 causes upward motion of a link 303 to pivot a retainer 304 counterclockwise (as viewed in FIG. 13) about a pivot pin 305 to remove a lip 306 on the retainer 304 from holding the hinged flap 251 in its closed position in which one end of the stick 250 (see FIG. 16) is supported by the hinged flap 251 and the lip 306 (see FIG. 13) of the retainer 304. With the hinged flap 251 no longer held by the lip 306 of the retainer 304, the weight of the stick 250 (see FIG. 16) and the plants 34 (see FIG. 1) thereon causes the hinged flap 251 to pivot counterclockwise (as viewed in FIG. 13) about the hinge 252 and against the force of the spring 255. As soon as the stick 250 (see FIG. 16)

exits from the U-shaped stick holders 254, the spring 255 (see FIG. 13) returns the hinged flap 251 to its closed position of FIG. 13.

The solenoid 301 is only energized when the pivotally mounted switch arm 299 (see FIG. 16) of the switch 300 is engaged by the rounded projection 298 on the bar 294. When the solenoid 301 is deenergized by the rounded projection 298 ceasing to engage the pivotally mounted switch arm 299 of the switch 300, a spring 306' returns the retainer 304 to the position in which the lip 306 (see FIG. 13) of the retainer 304 supports the hinged flap 251, which was returned earlier to its closed position of FIG. 13 by the spring 255.

While the rounded projection 298 (see FIG. 16) on the bar 294 also engages the pivotally mounted switch arm 299 of the switch 300 during upward movement of the bar 294 so that the solenoid 301 is energized to move the lip 306 (see FIG. 13) of the retainer 304 away from supporting the hinged flap 251, the hinged flap 251 remains in its closed position. This is because the spring 255 exerts a greater force than the weight of the empty stick 250 (see FIG. 16) but less than the weight of the stick 250 with the plants 34 (see FIG. 15) thereon. For example, the stick 250 weighs about one pound when empty and about thirty-five pounds when loaded. Thus, the spring 255 (see FIG. 13) has its force selected to hold the stick 250 (see FIG. 16) when empty but not when loaded with any of the tobacco plants 34.

When one end of the stick 250 (see FIG. 16) falls from the U-shaped stick holder 254, the other end of the stick 250 slides out of the recess 245 (see FIG. 6) at the end of the spear 32 and falls therefrom. The loaded stick 250 (see FIG. 12) falls onto a framework 307, which includes a pair of spaced, horizontal square tubes 308 (see FIG. 2) and 309 having their ends telescoping into the ends of two of the horizontal square tubes 25 for support.

A worker, who is standing on a platform 310 (see FIG. 2) then hands the loaded stick 250 (see FIG. 15) to another person or places the loaded stick on the ground, for example. The platform 310 (see FIG. 2) is supported by the chassis 11 (see FIG. 1).

Another of the sticks 250 (see FIG. 16) is supported adjacent opposite ends of the bar 294. The stick 250 is held against each of its ends between a plate 311 and a pivotally mounted holder 312. The plate 311 is secured to one side of the bar 294, and the holder 312 is pivotally mounted on a pivot pin 313 supported on a bracket 314 attached to the other side of the bar 294. A spring 315 continuously urges gripping teeth 316 on the holder 312 into engagement with the stick 250 to hold the stick 250 between the plate 311 and the holder 312.

Each of the holders 312 has a bent bottom end 317 of a trip rod 318 connected thereto and held thereon through a cotter pin 319. Each of the trip rods 318 extends through a guide 320, which is secured to the horizontal square tube 268A. Each of the trip rods 318 has a disc 321 adjustably mounted on its upper end.

As the bar 294 descends due to the extension of the piston rod 292 (see FIG. 15) from the cylinder 291, each of the discs 321 engages a spring 322, which is resting against the upper surface of the guide 320. This slows and essentially stops downward motion of the trip rods 2318, but the bar 294 continues downward motion to cause each of the holders 312 (see FIG. 16) to pivot counterclockwise (as viewed in FIG. 16) about the pivot pin 313 to release each end of the stick 250.

One end of the stick 250 entered the U-shaped holder 254 when it was positioned between one of the plates 311 and one of the holders 312. This end of the stick 250 drops onto the flap 251 when the holders 312 pivot away from the plates 311. The other end of the stick 250 is released into the recess 245 (see FIG. 6) in the spear 32 when the holders 312 (see FIG. 16) pivot away from the plates 311 as the holders 312 are just above the recess 245 (see FIG. 6).

As the springs 322 (see FIG. 15) compress, the disc 321 on one of the trip rods 318 engages a pivotally mounted switch arm 323 of a switch 324. The movement of the pivotally mounted switch arm 323 by the disc 321 occurs after release of the stick 250 from the bar 294.

The movement of the pivotally mounted switch arm 323 (see FIG. 18) of the switch 324 moves a movable contact 325 of the switch 324 away from engagement with a contact 326 of the switch 324. This interrupts a hold circuit for the coil 284 of the relay 140 through removing voltage from a lead 327. Accordingly, the coil 284 of the relay 140 is deenergized whereby the movable contact 139 of the relay 140 moves to the position of FIG. 18. Therefore, the solenoid 287 (see FIG. 19) is deenergized since the lead 286 no longer has a voltage thereon and the hydraulic control valve 288 is returned by the spring 289 to its position of FIG. 19. This stops supply of hydraulic fluid to the cylinder 291 whereby the spring 295 returns the bar 294 to its uppermost position to have another of the sticks 250 (see FIG. 15) loaded thereon by the worker on the platform 310 (see FIG. 2).

It should be understood that it is necessary for the relay 140 (see FIG. 18) to be inactivated at the time that the pivotally mounted switch arm 130 of the switch 131 is again moved by another of the tobacco plants 34 (see FIG. 1) being placed thereon. Thus, the switch 324 (see FIG. 15) insures that another cycle of operation does not start until the bar 294 has completed its downward movement and begun its ascent to its uppermost position, and the stick 250 is in its tobacco stick loading position.

Figure 15:
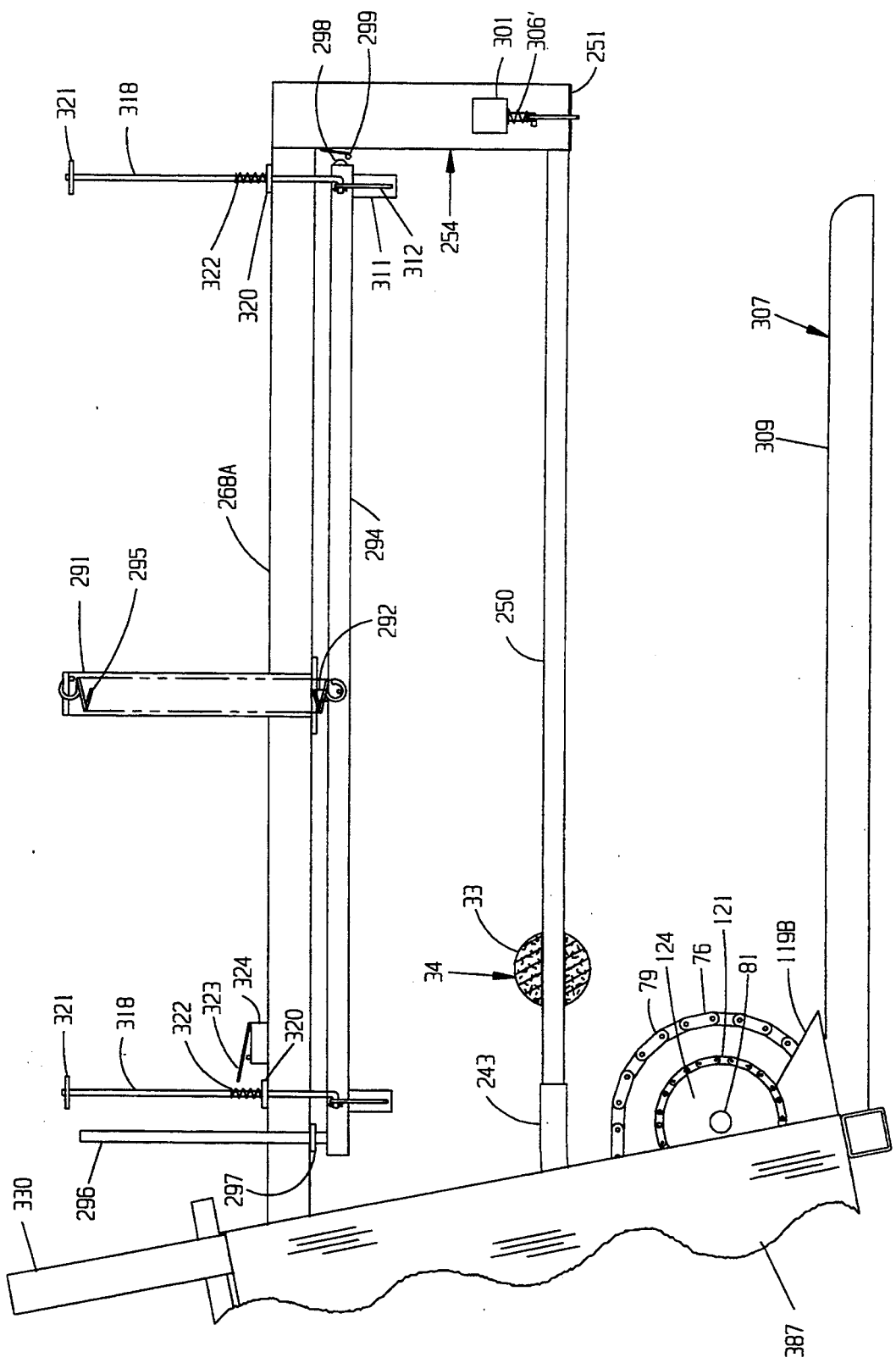
FIG. 15 is an enlarged fragmentary left side elevational view of an automatic stick loading mechanism.
Figure 17:
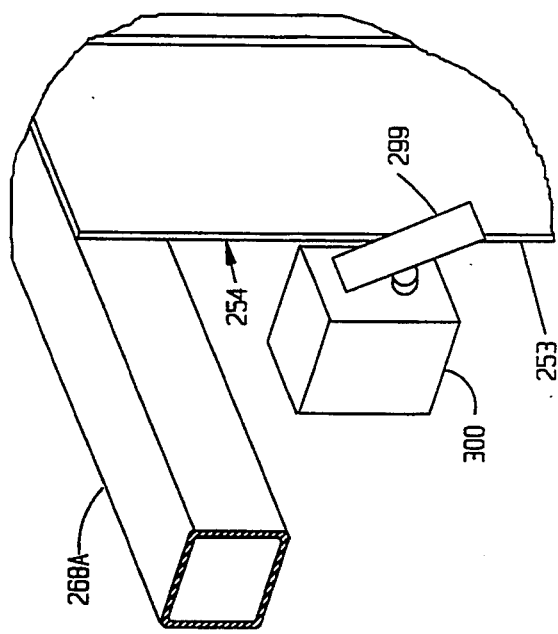
FIG. 17 is a fragmentary perspective view showing the position of a switch of FIG. 16 when it is used in a manual loading mode.

If desired, the automatic stick loading mechanism of FIG. 15 can be eliminated as can the tobacco plant loading and spacing mechanism of FIG. 3 for loading the plants automatically onto the stick 250 in a selected spaced relation to each other. With both of these mechanisms eliminated, the switch 300 (see FIG. 17) is supported by the side wall 253 of the U-shaped stick holder 254 so that the pivotally mounted switch arm 299 is disposed to be engaged by the stick 250 (see FIG. 16) when the stick 250 is moved downwardly within the U-shaped stick holder 254 by the worker. Thus, movement of the pivotally mounted switch arm 299 to close the switch 300 results in energization of the solenoid 301 (see FIG. 16) to raise the link 303 upwardly to pivot the retainer 304 and allow the stick 250 to fall by gravity through the hinged flap 251 moving downwardly.

If it is desired to employ the automatic stick loading mechanism of FIG. 15 without the plant loading and spacing mechanism of FIG. 3, it is necessary to position the pivotally mounted switch arm 280 (see FIG. 12) of the switch 281 for engagement by the worker on the platform 310 (see FIG. 2) when the stick 250 (see FIG. 12) has the desired number of the tobacco plants 34 thereon. It also is necessary for the worker to also space the tobacco plants 34 along the stick 250.

By adjustably mounting the horizontal square tube 268A on the longitudinally inclined square tube 31, the distance of the U-shaped stick holder 254 from the terminal end of the spear 32 can be adjusted. This enables different lengths of the stick 250 to be employed. It should be understood that no adjustment is necessary as long as the length of the sticks 250 do not vary by more than a selected length, which is preferably three inches, with this difference depending on the lengths of the plates 243 (see FIG. 6) and 244.

Figure 2:
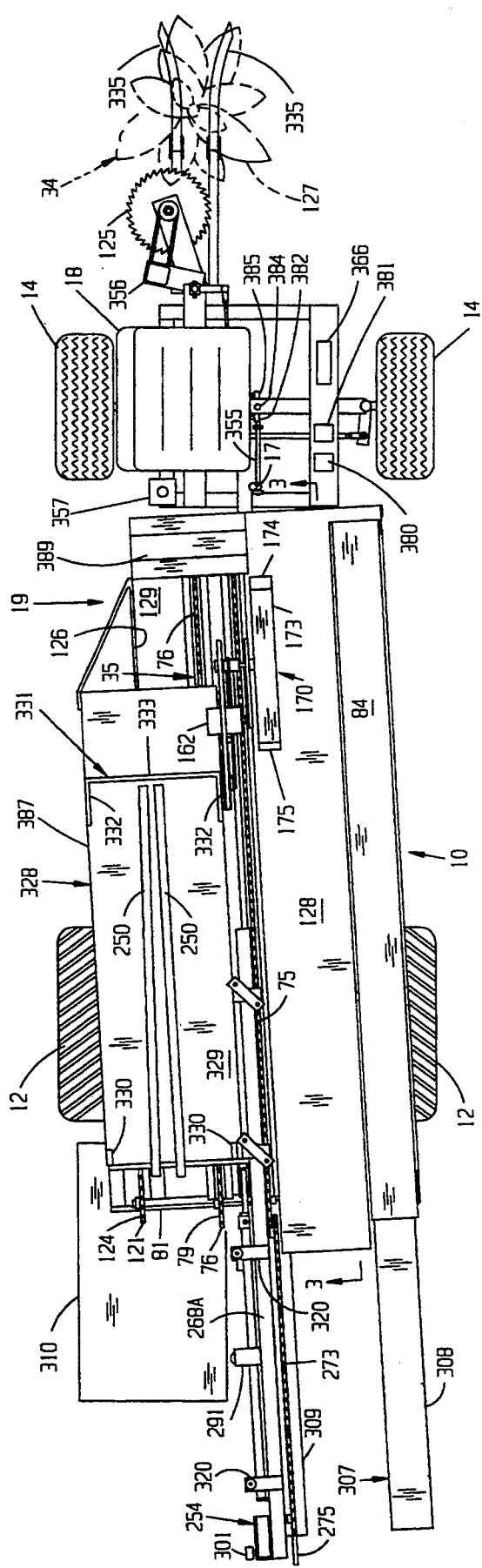
FIG. 2 is a top plan view of the tobacco harvester of FIG. 1 with some parts broken away and other parts omitted.

The sticks 250 (see FIG. 2) are supported within a rack 328. The rack 328 includes a floor 329 on which the sticks 250 rest with the floor 329 supported by the four horizontal square tubes 30 (see FIG. 3). A plate 330 extends upwardly from the rearmost of the four horizontal square tubes 30 (see FIG. 1) on each side of the floor 329 as shown in FIG. 2.

The floor 329 of the rack 328 has a U-shaped (as viewed in FIG. 2) end housing 331 having its legs 332 (see FIG. 3) extend upwardly therefrom adjacent each side. A front end wall 333 of the end housing 331 limits forward motion of the sticks 250 when they are loaded in the rack 328 from its rear. Thus, as shown in FIG. 2, a worker standing on the platform 310 can easily grasp one of the sticks 250 and remove it from the rack 328 prior to disposing the stick 250 on the bar 294 (see FIG. 15) or manually loading the stick 250 in the U-shaped stick holder 254 and the recess 245 (see FIG. 8) of the spear 32.

The tobacco harvester 10 (see FIG. 2) includes a pair of feeler guides 335, which are mounted for pivotal movement about a vertical shaft 336 (see FIG. 1) supported by the chassis 11. The feeler guides 335 (see FIG. 2) pass on each side of each of the plants 34 of a row. The feeler guides 335 enable automatic steering of the tobacco harvester 10.

Figure 23:
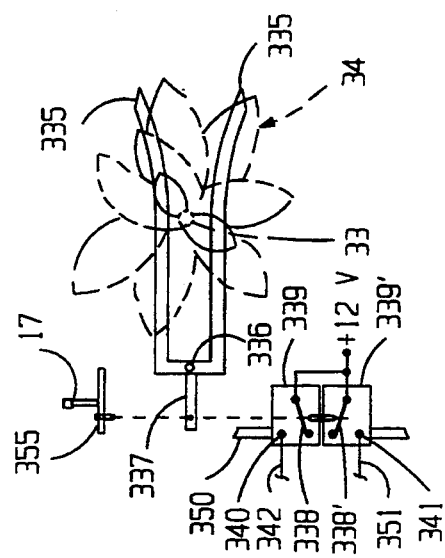
FIG. 23 is a schematic top plan view showing both a portion of the automatic steering arrangement and a manual steering lever.

The feeler guides 335 are connected through a linkage 337 (see FIG. 23) to move movable contacts 338 and 338' of switches 339 and 339', respectively, into engagement with contacts 340 and 341, respectively. When the movable contact 338 is moved into engagement with the contact 340, the battery (not shown) supplies 12 volts through a lead 342 to energize a solenoid 343 (see FIG. 22).

Energization of the solenoid 343 shifts the position of a hydraulic control valve 344 against the force of a spring 345 so that hydraulic fluid is supplied from a pump 346 through a line 347 to one side of a steering cylinder 348. This causes retraction of a piston rod 349 into the cylinder 348 to shift a steering tie rod 350 (see FIG. 23), which is connected to the piston rod 349 (see FIG. 22), in the correct direction to change the heading of the front wheels 14 (see FIG. 1).

Figure 22:
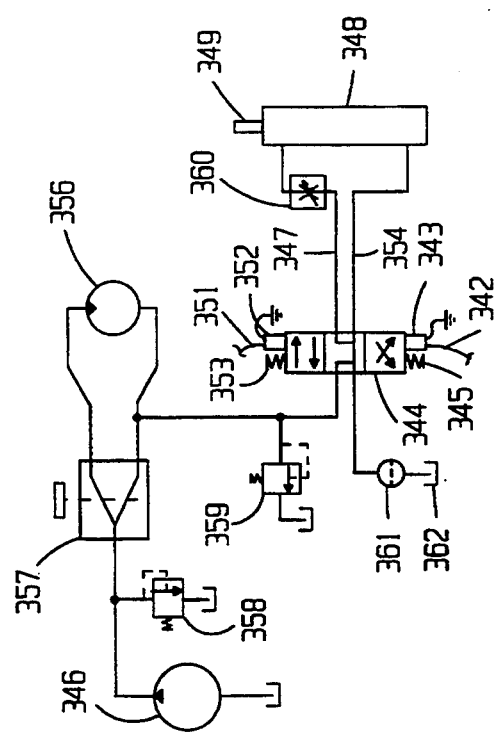
FIG. 22 is a schematic hydraulic circuit for controlling a cutting blade for severing each tobacco plant and an automatic steering arrangement for the tobacco harvester of FIG. 1.

When the feeler guides 335 (see FIG. 23) move the movable contact 338' of the switch 339' in the opposite direction so that the movable contact 338 engages the contact 341, the battery (not shown) supplies 12 volts over a lead 351 to energize a solenoid 352 (see FIG. 22). It should be understood that correction of the steering previously moved the movable contact 338 (see FIG. 23) away from engagement with the contact 340 so that the spring 345 (see FIG. 22) returned the hydraulic control valve 344 to its neutral position of FIG. 22 whereby there is no hydraulic fluid supplied to the cylinder 348.

When the solenoid 352 is energized, the hydraulic control valve 344 is shifted against the force of a spring 353 to enable the pump 346 to supply hydraulic fluid through a line 354 to the opposite side of the cylinder 348 to that to which the line 347 is connected. As a result, the piston rod 349 is extended from the cylinder 348 to shift the steering tie rod 350 (see FIG. 23) in the opposite direction. Again, when the correction has been made, the movable contact 338' is removed from engagement with the contact 341 to deenergize the solenoid 352 (see FIG. 23). Deenergization of the solenoid 352 enables the spring 353 (see FIG. 22) to return the hydraulic control valve 344 to its neutral position of FIG. 22.

The automatic steering may be overridden through moving the steering lever 17 (see FIG. 1) about a pivot rod 355. The steering lever 17 may be rotated either towards or away from the plane of the drawing of FIG. 1. Pivoting of the steering lever 17 also causes movement of one of the movable contacts 338 (see FIG. 23) and 339' of the switches 339 and 339', respectively, into engagement with one of the contacts 340 and 341, respectively. This turns the front wheels 14 (see FIG. 1) in the desired direction.

The pump 346 (see FIG. 22) also supplies hydraulic fluid in one direction only to a motor 356 for rotating the saw blade 125 (see FIG. 1). A manual control valve 357 controls the hydraulic fluid flow to the saw blade motor 356.

A high pressure relief valve 358 protects the saw blade motor 356, and a low pressure relief valve 359 protects the steering cylinder 348. A manual hydraulic flow control valve 360, which has a needle valve, enables adjustment of the response rate of the steering circuit. The hydraulic circuit of FIG. 22 also has an oil filter 361 in the return to a reservoir 362.

The direction of rotation of the propulsion motor 15 (see FIG. 19) is determined by the position of a hydraulic control valve 365. The hydraulic control valve 365 is shown in FIG. 19 in its neutral position in which there is no hydraulic fluid flow to the motor 15.

When the forward half of a foot pedal 366 (see FIG. 2), which has a rocker action, is held down, forward motion of the tobacco harvester 10 is produced by an electric switch (not shown) being closed to complete an electric circuit between the battery (not shown) and a solenoid 367 (see FIG. 19). Energization of the solenoid 367 shifts the hydraulic control valve 365 from its neutral position of FIG. 19 so that hydraulic fluid is supplied through a line 368 to the motor 15.

When the forward half of the foot pedal 366 (see FIG. 2) is released, the solenoid 367 (see FIG. 19) is deenergized, and a spring 369 returns the hydraulic control valve 365 to its neutral position of FIG. 19. Thus, the motor 15 can be activated only by holding down the foot pedal 366 (see FIG. 2) with forward motion of the tobacco harvester 10 being produced by holding down the forward half of the foot pedal 366.

When the rear half of the foot pedal 366 is depressed, a second electric switch (not shown) is closed to supply voltage from the battery (not shown) to a solenoid 370 (see FIG. 19). Energization of the solenoid 370 shifts the hydraulic control valve 365 in the opposite direction to that in which the solenoid 367 shifted the hydraulic control valve 365 whereby hydraulic fluid is supplied through a line 371 to the motor 15.

The hydraulic fluid is supplied to the line 368 or 371 from the variable displacement pump 154, which is connected to the reservoir 156. The pump 154 has its return connected through a filter 373.

When the rear half of the foot pedal 366 (see FIG. 2) is released, the solenoid 370 (see FIG. 19) is deenergized. A spring 375 returns the hydraulic control valve 365 to its neutral position of FIG. 19.

The hydraulic circuit of FIG. 19 also has a high pressure relief valve 376 and a low pressure relief valve 377 for safety purposes. A check valve 378 insures that the hydraulic fluid pressure in the cylinders 213, 226, and 239 provides a sufficient force to support the stick 250 (see FIG. 3) and the weight of the plants 34 on the stick 250 and the spear 32 during idle time between cycles of operation.

A foot pedal 380 (see FIG. 2) provides a braking function. The braking function may be accomplished in any well-known manner on either the rear wheels 12 or both the rear wheels 12 and the front wheels 14. It is preferred that the braking function have a disk caliper on the chassis 11 (see FIG. 1) and a disk mounted on the differential housing (not shown) for the rear axle 16.

Depression of a foot pedal 381 (see FIG. 2) produces a speed accelerator function in which the variable displacement pump 154 (see FIG. 19) has the volume of hydraulic fluid to the motor 15 increased to raise the speed of the motor 15 and decreased to reduce the speed of the motor 15.

A throttle control 382 (see FIG. 1) is disposed at the front edge of the seat 18 and supported on a support post 383 for the seat 18. A key ignition switch 384 is supported on the post 383. A speed adjustment 385 for steady field operation is mounted adjacent the front edge of the seat 18 on the opposite side of the post 383 from that supporting the throttle control 382.

A longitudinal sheet metal cover 386 extends along one side of the longitudinally inclined frame 19 and partially overlies the longitudinally spaced U-shaped supports 90 (see FIG. 10). A longitudinal sheet metal cover 387 is disposed on the opposite side of the longitudinally inclined frame 19 from the cover 386.

A sheet metal cover 388 (see FIG. 4) is mounted on the front of the longitudinally inclined frame 19 and has a top portion 389 (see FIG. 1) at its upper end overlying a portion of the first advancing means 35 (see FIG. 2). Sheet metal covers 390 (see FIG. 4) and 391 (see FIG. 1) are secured to opposite sides of the top portion 389 of the sheet metal cover 388 (see FIG. 4) to cover the open ends of the top portion 389 (see FIG. 1).

The longitudinally inclined frame 19 also has a sheet metal cover 392 (see FIG. 4) covering the portion of its front that is not covered by the sheet metal cover 388. The sheet metal cover 392 has a bent end slightly spaced from the sheet metal cover 386 with one of the vertical plates 88 closing the space therebetween as shown in FIG. 1.

Considering the operation of the present invention, the tobacco harvester 10 (see FIG. 2) is moved along a row of the tobacco plants 34. As each of the plants 34 is cut by the saw blade 125, a worker on the seat 18 (see FIG. 1) grasps the cut plant 34 and positions it on the pivotally mounted switch arm 130. The plant 34 has the stalk or stem 33 positioned closest to the guide wall 126.

When the pivotally mounted switch arm 130 is moved, the three flights 106 (see FIG. 3) and the three flights 107 (see FIG. 10) are moved simultaneously together provided that the switch 324 (see FIG. 18) is in its position of FIG. 18. The flight 106 at the lower right position in FIG. 3 and the corresponding flight 107 (see FIG. 10) advance the severed plant 34 (see FIG. 3) through the centering sheaves 169 and 186 to impale the stalk or stem 33 of the plant 34 on the pointed end portion of the spear 32. The advancement of the plant 34 stops with the flights 106 (see FIG. 3) and the flights 107 (see FIG. 10) again in the same position as shown in FIG. 3 for the flights 106. The advancement is stopped by the flight 106 (see FIG. 3) at the lower left position in FIG. 3 engaging the pivotally mounted switch arm 260 (see FIG. 14) of the switch 147.

During the next advancement of another of the plants 34 from the position of the pivotally mounted switch arm 130 (see FIG. 3) of the switch 131, the flight 106 at the upper position in FIG. 3 and the corresponding flight 107 (see FIG. 10) move the plant 34 (see FIG. 3) impaled on the spear 32 to the left. As the plant 34 is advanced along the spear 32, each pair of the pivotally mounted arms 43 and 44, 45 and 46, and 47 and 48 sequentially moves out of the way of the plant 34. This movement of the pivotally mounted arms 43–48 is controlled by the motion of the flight 106 moving from the left lower position to the right lower position and sequentially engaging the pivotally mounted switch arm 205 (see FIG. 3) of the switch 206, the pivotally mounted switch arm 219 of the switch 218, and the pivotally mounted switch arm 230 of the switch 231.

Figure 12:
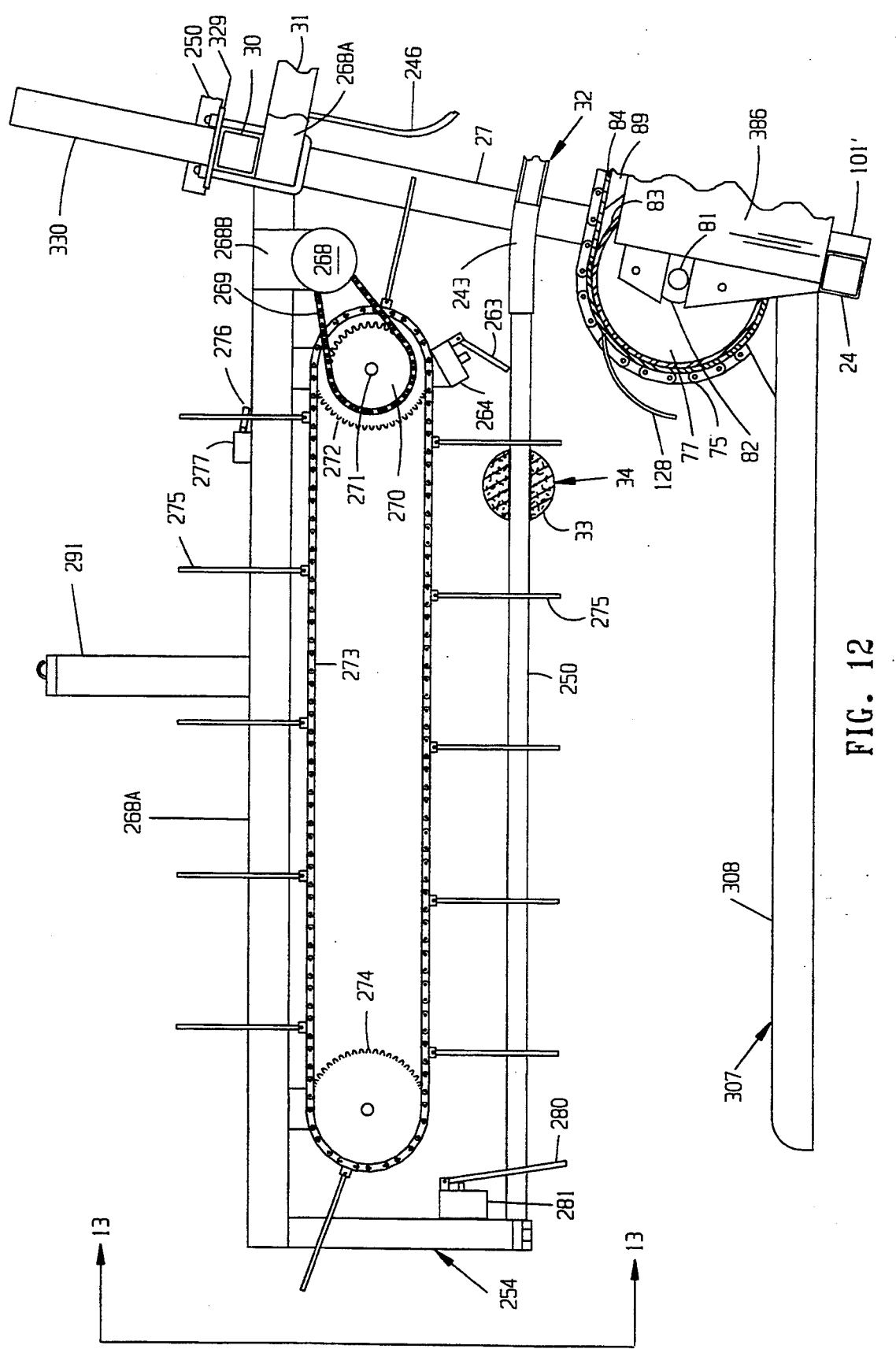
FIG. 12 is a right side elevational view of the rear portion of the tobacco harvester of the present invention and showing an advancing mechanism for automatically advancing each of a selected number of tobacco plants along a stick.

The plant 34 is advanced not only along the remaining length of the spear 32 but also onto the stick 250. The advancement of the plant 34 onto the stick 250 activates the pivotally mounted switch arm 263 (see FIG. 12) of the switch 264 to energize the motor 268 to move one of the fingers 275 into engagement with the stalk or stem 33 of the plant 34 on the stick 250 and advance it to the position in FIG. 12 showing the stalk or stem 33.

Of course, during advancement of the stalk or stem 33 of the tobacco plant 34 along the spear 32 (see FIG. 3), another of the severed plants 34 has been placed on the pivotally mounted switch arm 130 of the switch 131 to begin a cycle of operation. The plant 34 was advanced by the flight 106 and the corresponding flight 107 (see FIG. 10) to a position on the spear 32 (see FIG. 3) just past the centering sheaves 169 and 186.

When the stick 250 (see FIG. 12) has a selected number, such as six, for example, of the stalks or stems 33 of the plant 34 thereon with the six being supported on the stick 250 adjacent the end of the spear 32, the pivotally mounted switch arm 280 of the switch 281 is engaged by the forwardmost (leftmost in FIG. 12) of the six stalks or stems 33 on the stick 250.

With another of the sticks 250 retained on the bar 294 (see FIG. 15) and having been placed in position on the bar 294 as the plants 34 (see FIG. 12) were advanced from the spear 32 onto the stick 250 having one end supported in the recess 245 (see FIG. 8) of the spear 32, the bar 294 (see FIG. 15) is lowered when the switch 281 is closed. Downward movement of the bar 294 moves the pivotally mounted switch arm 299 (see FIG. 16) of the switch 300 to energize the solenoid 301. Energization of the solenoid 301 causes the stick 250, which has six of the plants 34 (see FIG. 15) thereon to fall from the U-shaped stick holder 254 because of pivoting of the retainer 304 (see FIG. 16) to enable the hinged flap 251 to be moved downwardly by the weight of the plants 34 (see FIG. 15) on the stick 250. The other end of the stick 250 falls out of the recess 245 (see FIG. 6) Of the spear 32. Accordingly, another of the sticks 250 (see FIG. 15) is disposed by the bar 294 to receive the stalk or stem 33 of the next tobacco plant 34.

An advantage of this invention is that a more efficient tobacco harvester is provided. Another advantage of this invention is that brittle tobacco plant leaves are damaged less. A further advantage of this invention is that the harvesting cost of tobacco is reduced by increasing throughput. Still another advantage of this invention is that the tobacco harvester is self propelled and does not require a tractor or other prime mover. A still further advantage of this invention is that only two workers are required to cut tobacco plants and place them on the sticks. Yet another advantage of this invention is that each tobacco plant is loaded on a stick from a front portion of a spear in a single continuous feeding operation during a single cycle.

For purposes of exemplification, a particular embodiment of the invention has been shown and described according to the best present understanding thereof, However, it will be apparent that changes and modifications in the arrangement and construction of the parts thereof may be resorted to without departing from the spirit and scope of the invention.

We claim:

1. An apparatus for loading a plurality of tobacco plants on a stick including:
    first advancing means for advancing each tobacco plant from a first position to a second position during a first cycle of operation and from its second position to a third position during a second cycle of operation;
    activating means for activating said first advancing means each time that a tobacco plant is at its first position to start a cycle of operation;
    spear means for spearing a stalk of each tobacco plant during advancement of each tobacco plant from its first position to its second position by said first advancing means;
    centering means for centering the stalk of each tobacco plant prior to advancement of each tobacco plant onto said spear means;
    holding means for holding a stick with its axis in the same vertical plane as the longitudinal axis of said spear means and the stick having one of its ends adjacent one end of said spear means so that the stick can receive each tobacco plant from said spear means during advancement of each tobacco plant from its second position on said spear means to its third position on the stick, said holding means preventing movement of the stick relative to said spear means;
    a plurality of longitudinally spaced releasably locking means for being releasably locked to said spear means to support said spear means as each tobacco plant is advanced by said first advancing means along said spear means from its second position on said spear means to its third position on the stick;
    and selectively moving means for selectively moving each of said releasably locking means away from supporting said spear means and returning each of said releasably locking means to support said spear means during advancement of each tobacco plant by said first advancing means along said spear means from its second position to its third position on the stick.

2. The apparatus according to claim 1 in which said holding means includes:
    stick receiving means on said spear means for receiving one end of the stick for support by said spear means;
    stick support means for supporting the other end of the stick received by said stick receiving means;
    and stick retaining means for retaining said stick support means in its stick supporting position during advancement of tobacco plants from said spear means to the stick.

3. The apparatus according to claim 2 including second advancing means, separate from said first advancing means, for advancing each tobacco plant along the stick after each tobacco plant has been advanced by said first advancing means from its second position on said spear means to its third position on the stick, said second advancing means including means for selectively spacing the tobacco plants along the stick a predetermined distance apart.

4. The apparatus according to claim 3 in which said first advancing means includes:
    endless drive means;
    a plurality of tobacco plant engaging means pivotally mounted on said endless drive means at equal linear distances from each other;
    first causing means for causing pivotal movement of each of said tobacco plant engaging means from a first position to a second position prior to each of said tobacco plant engaging means engaging a tobacco plant at the first position of the tobacco plant;
    and second causing means for causing pivotal movement of each of said tobacco plant engaging means from its second position to its first position after said tobacco plant engaging means has advanced the tobacco plant from said spear means to the stick having its ends supported by said stick receiving means of said holding means and said stick support means of said holding means.

5. The apparatus according to claim 4 in which said centering means includes:
    an upper endless belt;
    a lower endless belt;
    driving means for driving at least said upper endless belt;
    and means for continuously urging said endless belts toward each other.

6. The apparatus according to claim 5 including:
    at least three of said releasably locking means for supporting said spear means against movement;
    at least two of said releasably locking means always supporting said spear means during advancement of each tobacco plant along said spear means from its second position to its third position on the stick by said first advancing means;
    said selectively moving means including control means for controlling when each of said releasably locking means is moved away from supporting said spear means and returned to support said spear means during advancement of each tobacco plant along said spear means by said first advancing means;
    and said control means of said selectively moving means including insuring means for insuring that each of said releasably locking means is not moved away from supporting said spear means until said spear means is supported by the remainder of said releasably locking means.

7. The apparatus according to claim 6 in which said control means of said selectively moving means includes:

a plurality of separate means equal in number to the number of said releasably locking means;

and each of said separate means being activated by another of said tobacco plant engaging means than said tobacco engaging means advancing a tobacco plant along said spear means from its second position to its third position to cause one of said releasably locking means to be moved away from supporting said spear means and returned to support said spear means.

8. The apparatus according to claim 7 including leaf retaining means for retaining leaves of the tobacco plant downward during advancement of each tobacco plant along said spear means.

9. The apparatus according to claim 8 in which said stick retaining means includes:

stick moving means for causing movement of said stick support means of said holding means from its stick supporting position after a predetermined number of tobacco plants has been advanced onto the stick from said spear means by said first advancing means during a plurality of cycles of operation whereby the other end of the stick ceases to be supported by said stick support means of said holding means and the one end of the stick ceases to be supported by said stick receiving means of said holding means;

and return means for returning said stick support means of said holding means to its stick supporting position after the other end of the stick ceases to be supported by said stick support means of said holding means.

10. The apparatus according to claim 9 in which:

said stick support means of said holding means includes:

pivotally mounted means for supporting the other end of the stick;

and support means for supporting said pivotally mounted means in its stick supporting position;

said return means includes means for urging said pivotally mounted means to its stick supporting position when no stick is supported on said pivotally mounted means;

and said stick moving means includes means for causing said support means of said stick support means to cease to support said pivotally mounted means in its stick supporting position whereby said pivotally mounted means is moved out of its stick supporting position by the weight of the stick and the tobacco plants thereon.

11. The apparatus according to claim 9 including stick loading means for automatically loading another stick for support by said stick receiving means of said holding means and said stick support means of said holding means after said stick support means of said holding means has been returned to its stick supporting position.

12. The apparatus according to claim 11 including preventing means for preventing movement of said tobacco plant engaging means when said stick loading means is effective by preventing said activating means from being effective to activate said first advancing means until said stick loading means is ineffective.

13. The apparatus according to claim 6 in which each of said releasably locking means includes:

a pair of pivotally mounted arms connected to each other for simultaneously moving toward and away from said spear means;

one of said pair of said pivotally mounted arms being pivotally mounted above said spear means and the other of said pair of said pivotally mounted means being pivotally mounted below said spear means;

each of said pivotally mounted arms of said pair of said pivotally mounted arms having a pair of substantially parallel plates disposed on opposite sides of its end remote from its pivotal mounting;

and said pair of plates on each of said pivotally mounted arms of said pair of said pivotally mounted arms straddling said spear means so that said one pivotally mounted arm of said pair of said pivotally mounted arms has its end surface firmly engaging said spear means on its top and said other pivotally mounted arm of said pair of said pivotally mounted arms has its end surface firmly engaging said spear means on its bottom so that said spear means is supported against movement.

14. The apparatus according to claim 13 in which:

said control means of said selectively moving means includes:

a plurality of sensing means for sensing the presence of one of said tobacco plant engaging means during its advancement to a plurality of positions corresponding to the positions of another of said tobacco plant engaging means when said another tobacco plant engaging means is advancing a tobacco plant from its second position to its third position with each position of said another tobacco engaging means being just prior to the spear support position of one of said pairs of said pivotally mounted arms;

and means responsive to each of said sensing means to cause movement of .one of said pairs of said pivotally mounted arms away from supporting said spear means until said another tobacco plant engaging means has passed the position on said spear means at which said pair of pivotally mounted arms engages said spear means;

and said insuring means of said control means of said selectively moving means includes preventing means for preventing said responsive means from being effective until the remainder of said pairs of said pivotally mounted arms is supporting said spear means.

15. The apparatus according to claim 4 including retaining means for retaining each of said tobacco plant engaging means in its second position from prior to said tobacco plant engaging means engaging a tobacco plant at the first position of the tobacco plant until the tobacco plant is advanced to its third position by said tobacco plant engaging means.

16. The apparatus according to claim 1 in which:

each of said releasably locking means includes:

a pair of pivotally mounted arms connected to each other for simultaneously movement toward and away from said spear means;

first pivotal mounting means for pivotally mounting one of said pivotally mounted arms above said spear means;

second pivotal mounting means for pivotally mounting the other of said pivotally mounted arms below said spear means;

said first pivotal mounting means and said second pivotal mounting means pivotally mounting said pivotally mounted arms so that said pivotally mounted arms pivot in opposite directions when pivoted toward or away from said spear means;

and hydraulic control means for causing simultaneous pivotal movement of said pair of said pivotally mounted arms toward or away from said spear means;

and said selectively moving means includes:
a plurality of electrical switch means equal in number to the number of said releasably locking means;

each of said electrical switch means causing activation and deactivation of one of said hydraulic control means;

each of said electrical switch means causing activation of one of said hydraulic control means prior to a tobacco plant being advanced along said spear means to said pair of said pivotally mounted arms controlled by one of said hydraulic control means and inactivating said one hydraulic control means after the tobacco plant has been advanced past said pair of said pivotally mounted arms controlled by said one hydraulic control means;

and electrical interlock means for preventing activation of any of the other of said hydraulic control means by another of said electrical switch means until said electrical switch means for said one hydraulic control means has inactivated said one hydraulic control means.

17. The apparatus according to claim 16 in which:
said first advancing means includes:
endless drive means;
a plurality of tobacco plant engaging means pivotally mounted on said endless drive means at equal linear distances from each other;
first causing means for causing pivotal movement of each of said tobacco plant engaging means from a first position to a second position prior to each of said tobacco plant engaging means engaging a tobacco plant at the first position of the tobacco plant;
and second causing means for causing pivotal movement of each of said tobacco plant engaging means from its second position to its first position after said tobacco plant engaging means has advanced the tobacco plant from said spear means to the stick having its ends supported by said holding means;
each of said tobacco plant engaging means includes activating means for activating each of said electrical switch means during a cycle of operation when said tobacco plant engaging means is in its first position;
and each of said electrical switch means is activated and inactivated by said activating means of another of said tobacco plant engaging means than said tobacco plant engaging means advancing the tobacco plant along said spear means from its second position to its third position on the stick to cause one of said hydraulic control means to be activated to pivot said pair of said pivotally mounted arms away from supporting said spear means and to be inactivated to pivot said pair of said pivotally mounted arms toward said spear means to return said pair of said pivotally mounted arms to support said spear means.

18. The apparatus according to claim 16 including:
connecting means for connecting one of said pair of said pivotally mounted arms to said other pivotally mounted arm of said pair of said pivotally mounted arms;
and said hydraulic control means including means connected to said connecting means.

19. The apparatus according to claim 1 in which said centering means includes:
an upper endless belt;
a lower endless belt;
driving means for driving at least said upper endless belt;
and means for continuously urging said endless belts toward each other.

20. The apparatus according to claim 1 including:
at least three of said releasably locking means for supporting said spear means against movement;
at least two of said releasably locking means always supporting said spear means during advancement of each tobacco plant along said spear means from its second position to its third position on the stick by said first advancing means;
and said selectively moving means including control means for controlling when each of said releasably locking means is moved away from supporting said spear means and returned to support said spear means during advancement of each tobacco plant along said spear means by said first advancing means, said control means including insuring means for insuring that each of said releasably locking means is not moved away from supporting said spear means until said spear means is supported by the remainder of said releasably locking means.

* * * * *

UNITED STATES PATENT AND TRADEMARK OFFICE
CERTIFICATE OF CORRECTION

PATENT NO. : 5,400,577
DATED : March 28, 1995
INVENTOR(S) : George A. Duncan et al It is certified that error appears in the above-identified patent and that said Letters Patent is hereby corrected as shown below:

Column 4, line 58, "515B" should read -- 55B --
Column 13, line 44, "The sprocket. 270" should read -- The
    sprocket 270 --
Column 14, line 5, "122" should read -- 12 --
Column 15, line 1, "holders" should read -- holder --
Column 15, line 65, "2318" should read -- 318 --
Column 20, line 65, "Of" should read -- of --

Signed and Sealed this

Twenty-fifth Day of July, 1995

BRUCE LEHMAN

Attest:

Attesting Officer    Commissioner of Patents and Trademarks